INVENTORS
WARREN D. NUTTEN &
BERNARD C. PHILLIPS
BY Harry O. Ernsberger
ATTORNEY INVENTORS
WARREN D. NUTTEN &
BERNARD C. PHILLIPS
BY
Harry O. Ernsberger
ATTORNEY INVENTORS
WARREN D. NUTTEN &
BERNARD C. PHILLIPS
BY
Harry O. Ernsberger
ATTORNEY

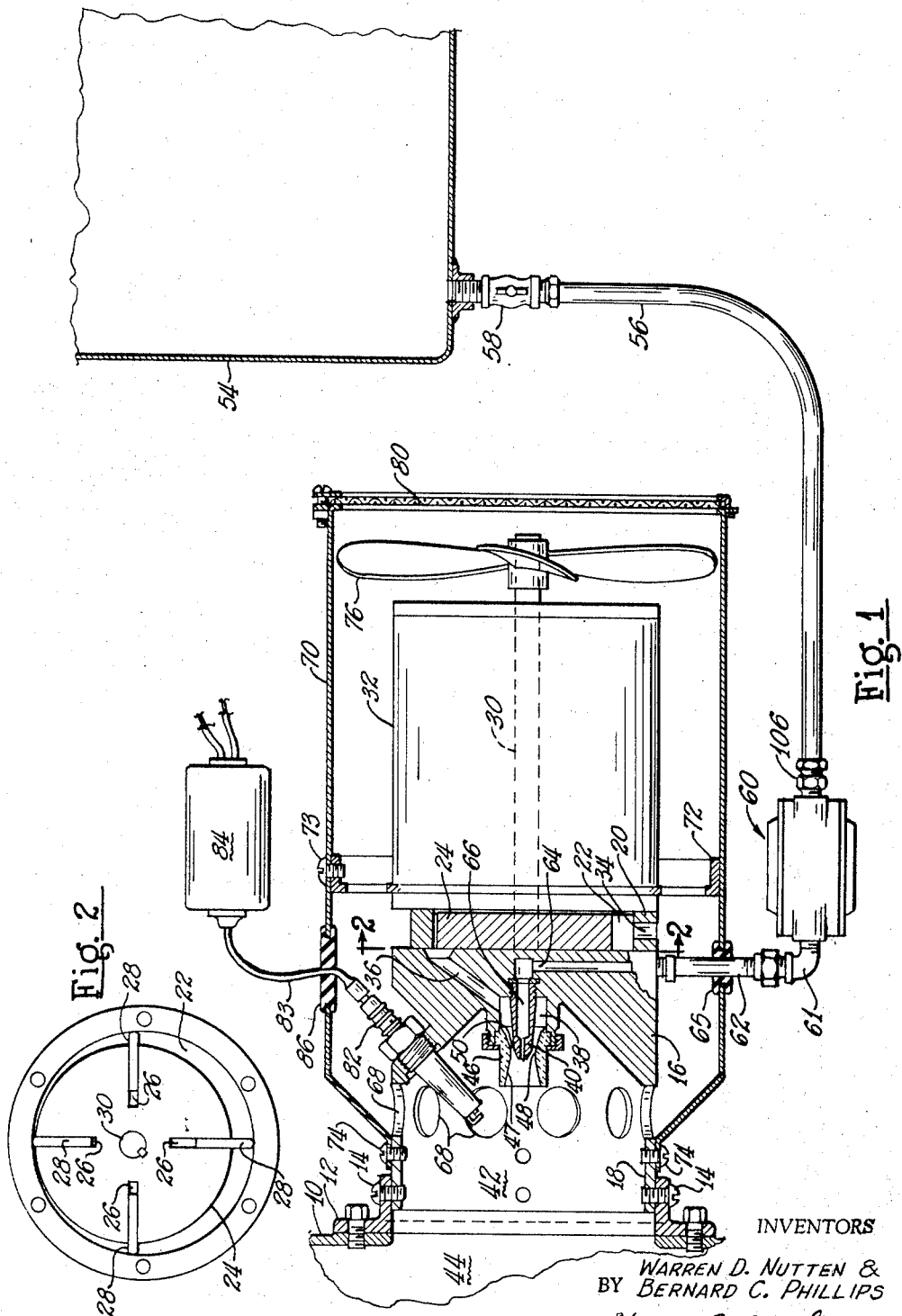

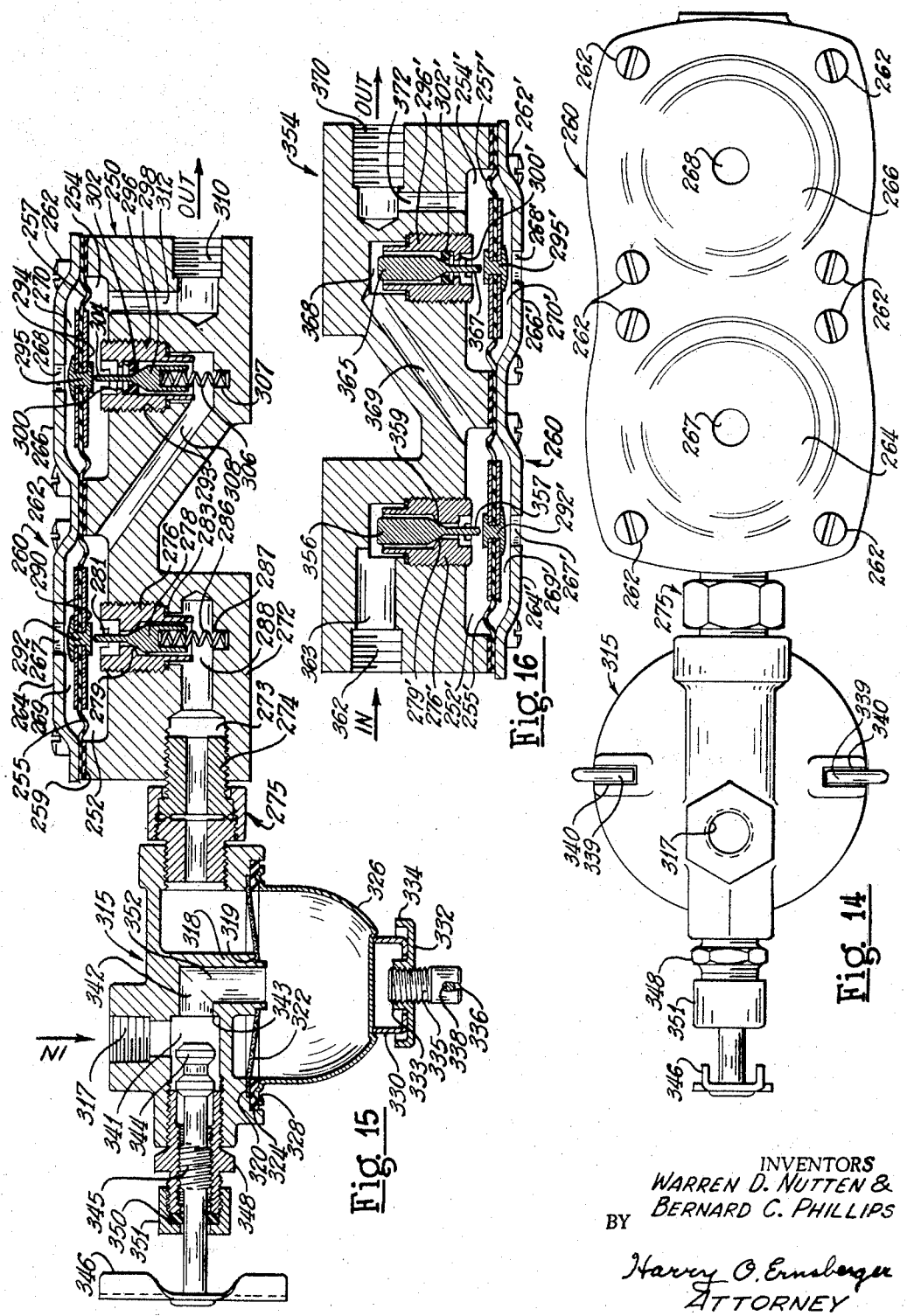

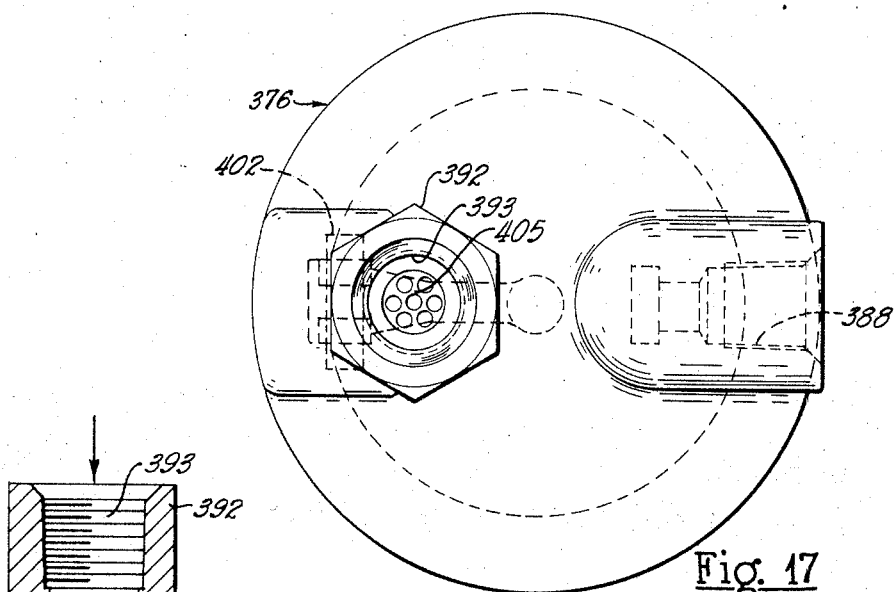
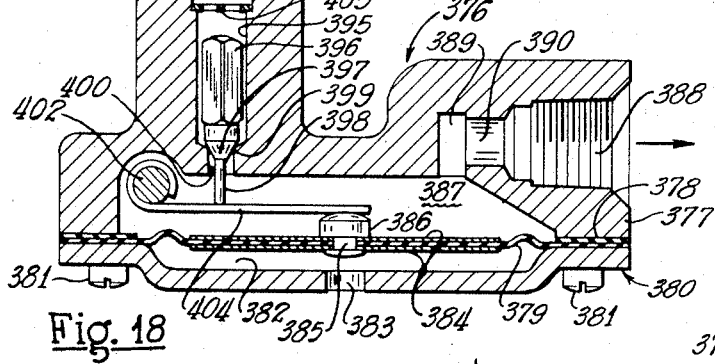
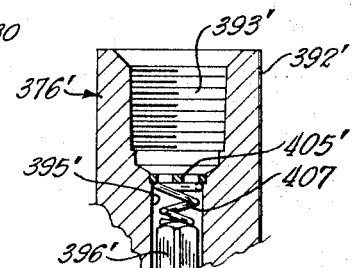
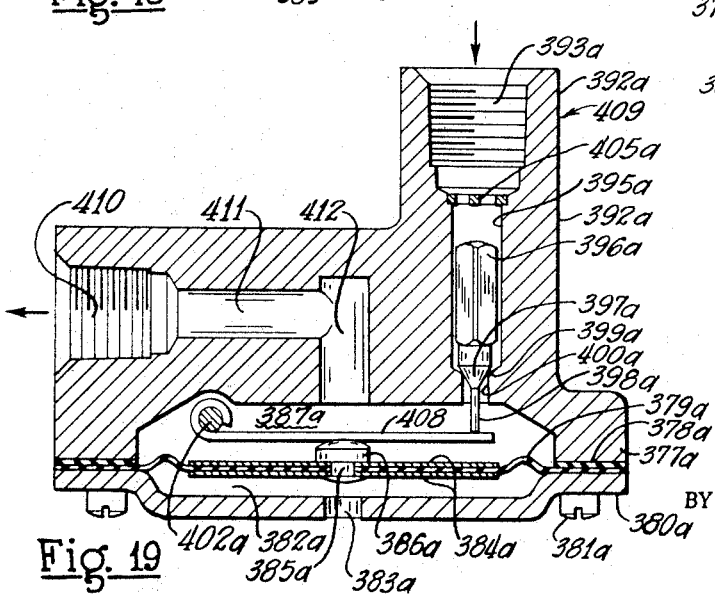
Fig. 17
Fig. 18
Fig. 19
Fig. 20
INVENTORS
WARREN D. NUTTEN &
BERNARD C. PHILLIPS
BY
Harry O. Ernsberger
ATTORNEY

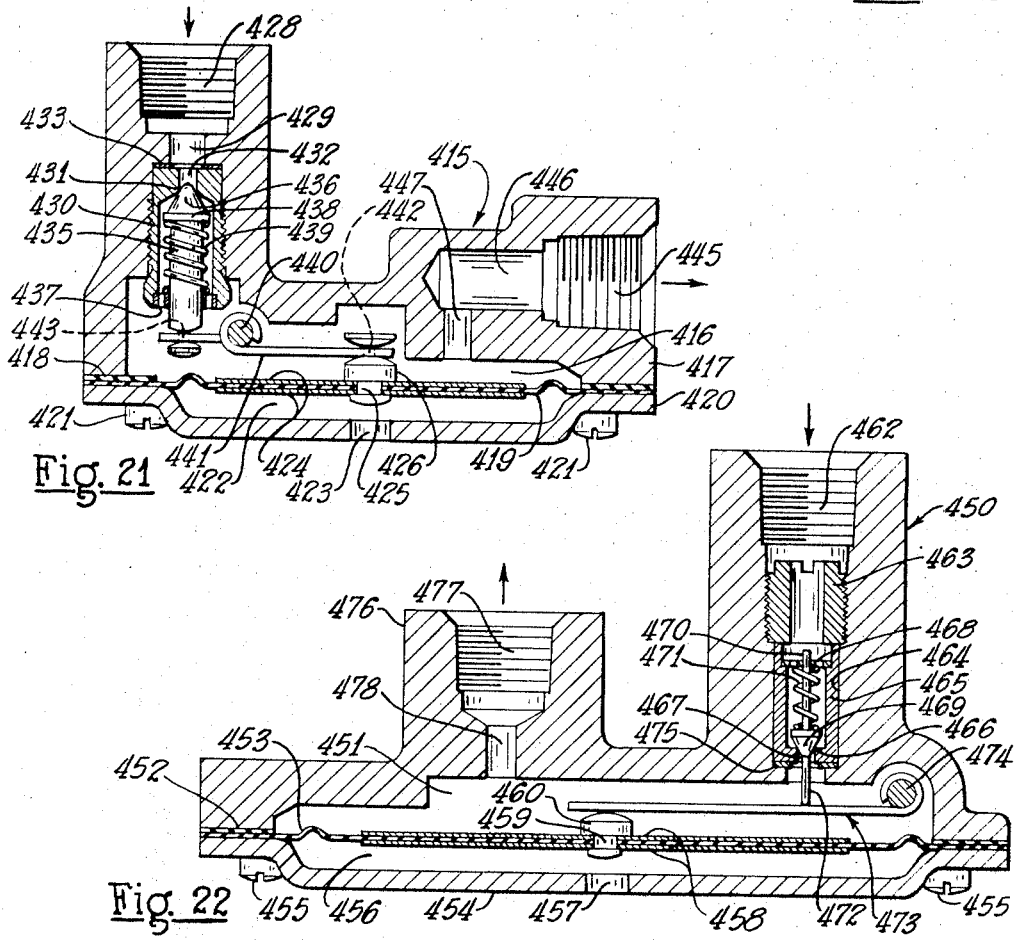

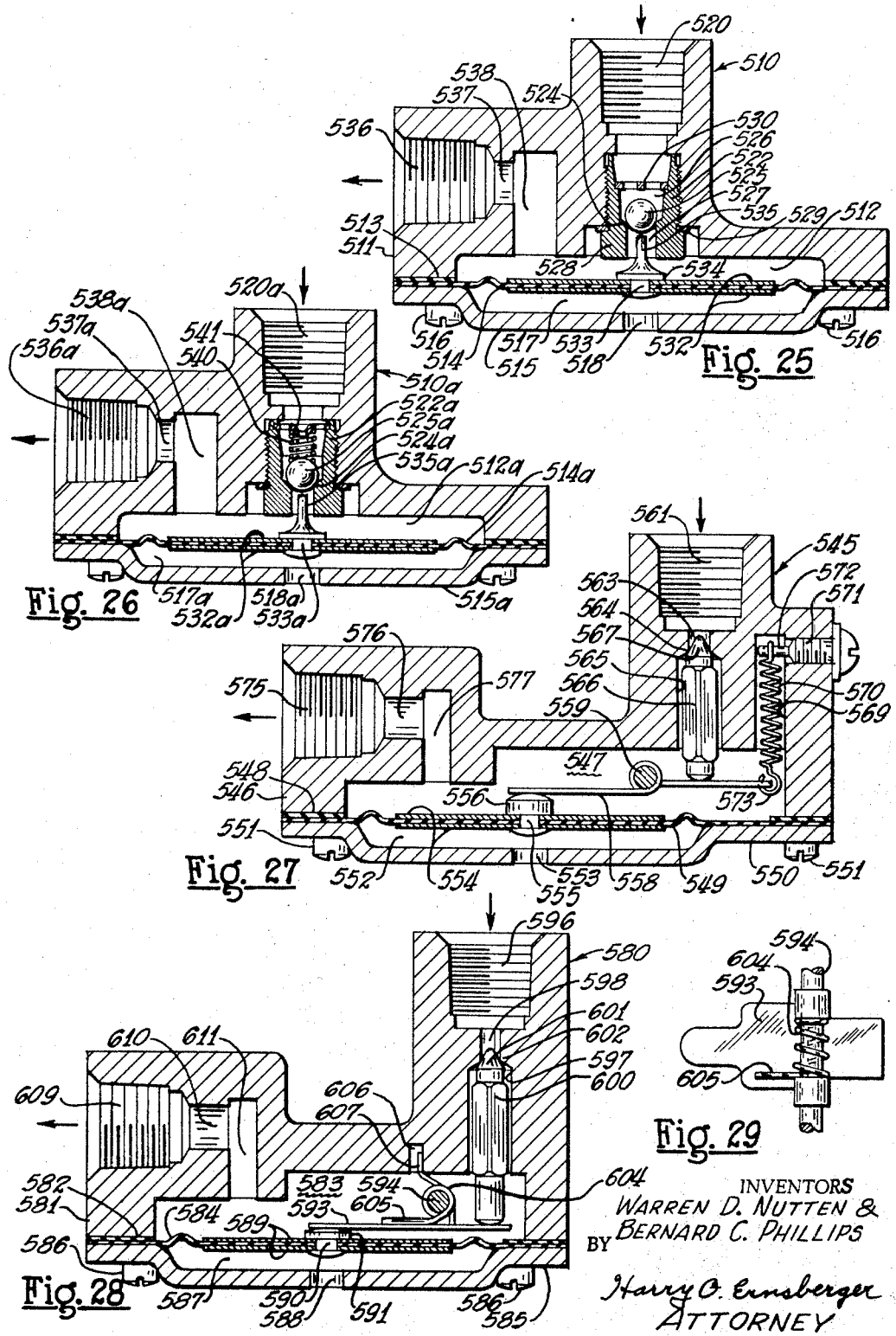

United States Patent Office 3,428,406
Patented Feb. 18, 1969

3,428,406
LIQUID FUEL BURNER SYSTEM AND FUEL CONTROL
Warren D. Nutten and Bernard C. Phillips, Toledo, Ohio, assignors to The Tillotson Manufacturing Company, Toledo, Ohio, a corporation of Ohio
Original application May 19, 1964, Ser. No. 368,475, now Patent No. 3,377,024, dated Apr. 9, 1968. Divided and this application Feb. 19, 1968, Ser. No. 706,451
U.S. Cl. 431—12                            7 Claims
Int. Cl. F23n *1/00;* F16k *31/12, 31/36*

ABSTRACT OF THE DISCLOSURE

Fuel pressure used with an aspirating type fuel nozzle controls actuation of a diaphragm in a chamber to regulate a valve in a passage controlling fuel flow to the nozzle.

---

This is a division of application Ser. No. 368,475, filed May 19, 1964, now Patent No. 3,377,024.

This invention relates to a liquid fuel combustion burner sysem and control and more particularly to a fuel control for a combustion burner of a character wherein liquid hydrocarbon fuel is aspirated under the influence of a high velocity air stream into a fuel and air mixing zone.

Liquid hydrocarbon fuels, such as fuel oils, have been used in fuel burners of a character wherein an air stream is utilized to aspirate fuel from a fuel bowl equipped with a float-controlled valve and supplied with liquid fuel from a fuel supply tank located above the burner whereby the fuel is elevated or lifted from the float or fuel bowl by reduced pressure or suction develoed by an air stream and the liquid fuel mixed with the air to provide a combustible mixture. Arrangements of this character have been used in burners for salamanders and for similar uses.

In combustion burners of this character the fuel supply tank must necessarily be disposed above the float bowl because of lack of control of fuel feed for a fuel supply disposed below the burner. In such installations the fuel tank is disposed above the burner providing a gravity or pressure head of liquid fuel operative against the float-controlled valve arrangement. With such arrangement, the float control is subservient in a measure to variations in the level of the fuel in the float bowl resulting in variations in fuel delivery to the burner nozzle. As the fuel bowl must be vented, it presents a serious fire hazard and, furthermore, the fuel bowl must be maintained stationary and in an upright position in order to function.

The present invention embraces a method of controlling delivery of liquid fuel to a combustion burner from a fuel tank which includes esablishing an air stream and flowing fuel from a flexible walled chamber to the combustion zone of the burner by aspiration set up by the air stream, normally biasing a fuel inlet valve in a fuel duct from a fuel supply to closed position, and opening the inlet valve by movement of the flexible wall under the influence of differential pressures to effect delivery of fuel to the burner nozzle.

The invention embraces a method of controlling delivery of liquid fuel to the combustion zone of a combustion burner involving the use of a pressure responsive member controlling a fuel inlet valve whereby fuel is delivered to the burner when differential pressures are developed of a magnitude affecting the member to overcome a biasing force normally closing the inlet valve whereby the said control is effective irrespective of whether the fuel supply is maintained above or below the combustion burner.

Another object of the invention resides in a control for liquid fuel delivered to a combustion burner wherein the control is influenced by differential pressure set up by an air stream into which the fuel is delivered and wherein means normally biasing a fuel inlet valve to closed position must be overcome by differential pressure before fuel is delivered to the combustion zone.

Another object of the invention resides in the provision of a pressure responsive arrangement for controlling delivery of liquid fuel into an air stream of a combustion burner wherein a diaphragm actuated by differential pressures contorls a fuel inlet valve, the arrangement including means normally biasing the inlet valve closed whereby impairment of operating pressure or fracture of the diaphragm results in instant closure of the fuel inlet valve to thereby reduce the hazard of fire.

Another object of the invention resides in the provision of a differential pressure control of the delivery of fuel by aspiration to a combustion zone of a combustion burner which is effective irrespective of the relative position of the fuel tank with respect to the burner.

Another object of the invention is the provision of a pressure responsive control system particularly usable for controlling delivery of liquid fuel to a mixing region of a combustion burner wherein the system includes dual pressure responsive devices arranged in sequential relation and each provided with a diaphragm actuated fuel valve for controlling fuel flow under the influence of presure responsive diaphragms providing protection against fire hazard and wherein impairment or failure of one device effectively interrupts fuel flow.

Another object of the invention is the provision of a pressure responsive control unit for connection between a fuel supply and a fuel delivery nozzle of a combustion burner wherein the unit is of compact construction embodying dual valves, each controlled independently by a pressure responsive device, the valves being arranged in sequence and each provided with means effective to close an inlet valve upon failure or impairment of the pressure responsive means.

Another object of the invention resides in a pressure responsive control unit associated with or embodying an effective fuel filter for straining the fuel prior to its delivery through the unit to minimize the liability of foreign matter impairing the closing of the inlet valve or valves of the control unit.

Another object of the invention resides in a single control unit or dual units in sequential relation each embodying a pressure responsive diaphragm arranged to be actuated by pressure of an air stream delivered to the combustion zone of the burner in combination with means for positively interrupting fuel flow from a supply upon failure of air pressure or impairment or fracture of a diaphragm.

Another object of the invention is the provision of a differential pressure actuated unit for controlling flow of liquid fuel to an aspirated nozzle of a combustion burner arranged to automatically interrupt fuel flow upon mipairment or failure of aspiration at the burner nozzle.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semi-schematic view, partly in section, of a liquid fuel feed and air mixing arrangement for a combustion burner embodying a form of differential pressure-actuated fuel flow control means of the invention;

FIGURE 2 is a sectional view taken substantially on the line 2—2 of FIGURE 1;

FIGURE 14 is a top plan view showing an arrangement of dual fuel control mechanisms within a housing and a fuel filter construction;

FIGURE 15 is a longitudinal sectional view of the arrangement shown in FIGURE 14;

FIGURE 16 is a sectional view illustrating a modification of the fuel flow control arrangement of FIGURE 15;

FIGURE 17 is a top plan view illustrating a modified form of fuel flow control unit of the invention;

FIGURE 18 is a vertical sectional view of the construction shown in FIGURE 17;

FIGURE 19 is a sectional view illustrating a modified form of fuel flow control unit;

FIGURE 20 is a detail sectional view illustrating a form of biasing means for a fuel inlet control valve;

FIGURE 21 is a sectional view illustrating another form of fuel flow control mechanism;

FIGURE 2 illustrates another form of fuel flow control mechanism;

FIGURE 23 is a sectional view illustrating another form of fuel flow control mechanism;

FIGURE 24 is a detail view taken substantially on the line 24—24 of FIGURE 23;

FIGURE 25 is a sectional view illustrating another form of fuel flow control mechanism;

FIGURE 26 is a sectional view illustrating another form of fuel flow control mechanism;

FIGURE 27 is a sectional view illustrating another form of fuel flow control mechanism;

FIGURE 28 is a sectional view illustrating another form of fuel flow control mechanism;

FIGURE 29 is a fragmentary detail view of a portion of the construction illustrated in FIGURE 28;

Figure 3:
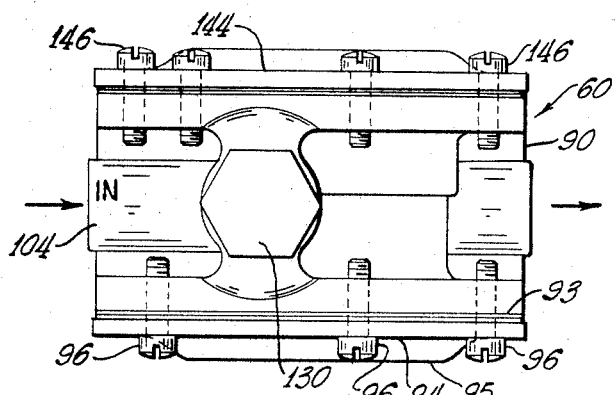
FIGURE 3 is an elevational view of the fuel control means shown in FIGURE 1.

The method and apparatus of the invention are particularly adapted for controlling flow of liquid fuel to a delivery nozzle of a combustion burner of a type wherein the fuel is aspirated into an air stream and the mixture ignited in a combustion zone of a burner, such as burners used in salamanders, oil fired burners used with heating furnaces and the like.

Referring to the drawings in detail and initially to FIGURES 1 and 2, there is illustrated a burner construction which may be associated with a combustion chamber or zone defined by a member 10, a circular bracket 12 of conventional construction being employed for mounting the burner to the member 10. In the arrangement illustrated in FIGURE 1, the burner is inclusive of a generally cylindrically-shaped member 16 having a hollow sleeve portion 18, the forward end of the sleeve being secured by screws 14 to the bracket 12. Disposed at the rear of the member 16 is a vane type rotary pump comprising a housing 20 having an interior circular chamber 22. Rotatably mounted in the chamber 22 on an axis eccentric to the axis of the chamber 22 is a rotor 24 provided with radial slots 26 in which are disposed relatively slidable vanes 28. The rotor 24 is fixedly secured upon a shaft 30 of an electrically energizable motor 32.

The member 20 is provided with an opening or port 34 providing for the entrance of air into the pump chamber 22. The member 16 is provided with an outlet duct 36 which is in communication with the pump chamber 22 and through which air, which is compressed by rotation of the pump rotor 24, is delivered to a chamber 38 arranged axially in the member 16. Arranged axially of the chamber 38 is a fuel delivery nozzle 40 through which fuel is delivered into an ignition zone 42 defined by the sleeve 18, the burning mixture being delivered into a combustion zone or region 44.

In the embodiment illustrated, a member 46 surrounds the fuel delivery nozzle 40 and has its interior surface 47 of venturi configuration providing a restricted zone or band 48 adjacent the outlet of the nozzle 40. In the embodiment illustrated, fuel is aspirated through the nozzle 40 by the velocity of the air stream passing through the annular restricted space 50 at the choke band of the venturi which sets up a reduced or subatmospheric pressure at the nozzle outlet.

Fuel is supplied from a tank or receptacle 54 through a conduit or pipe 56, a manually operable valve 58 being provided in the conduit 56 for cutting off the fuel supply when desired. The conduit 56 conveys fuel to the inlet side of a pressure actuated fuel control mechanism or unit 60 hereinafter described in detail. Fuel is conveyed from the outlet of the unit 60 through a fitting 61, pipe 62 and interconnecting channels 64 and 66 in member 16 to the nozzle 40 for delivery through the nozzle.

Fuel aspirated from the nozzle 40 is initially mixed with air delivered from the air pump chamber 22 flowing at substantial velocity through the annular space 50 of the venturi, and additional air is mixed with the fuel through openings 68 formed in the sleeve portion 18 of the member 16 to provide the requisite amount of air for satisfactory combustion in zones 42 and 44.

Surrounding the burner construction and the motor 32 is a housing 70 of generally cylindrical shape which is secured to an annular bracket 72 mounted by the motor 32, screws 73 securing the housing to the bracket.

The forward portion of the housing 70 is flared inwardly and the terminal portion thereof secured to the sleeve 18 by screws 74. Mounted upon the rear end of the motor shaft 30 is an impeller or fan 76 which is rotated by the motor and provides a moving air stream along the exterior of the motor 32 and through the openings 68. A filter or screen 80 is secured to the rear end of the housing 70 for filtering the air moved by the impeller 76 and the air compressed in the pump chamber 22.

A spark plug 82 is threaded into an opening in the member 16, the spark plug being connected by a conductor 83 with an ignition coil or transformer 84 supplied with alternating current in a conventional manner. The conductor 83 extends through a rubber grommet 86 mounted in an opening in the wall of the housing 70. The spark plug ignites the mixture of liquid fuel and air in the zone 42 and the burning mixture enters the combustion zone 44 and is completely burned therein. The pipe 62 extends through a grommet 65 mounted in an opening in the housing 70.

It is to be understood that other forms of air and fuel mixing arrangements may be used in lieu of the venturi construction 47.

For example, a conventional type of fuel and air aspirating mixing nozzle may be employed. The burner arrangement described is of a character for burning conventional liquid hydrocarbon fuels such as fuel oils for conventional combustion burners.

Figure 4:
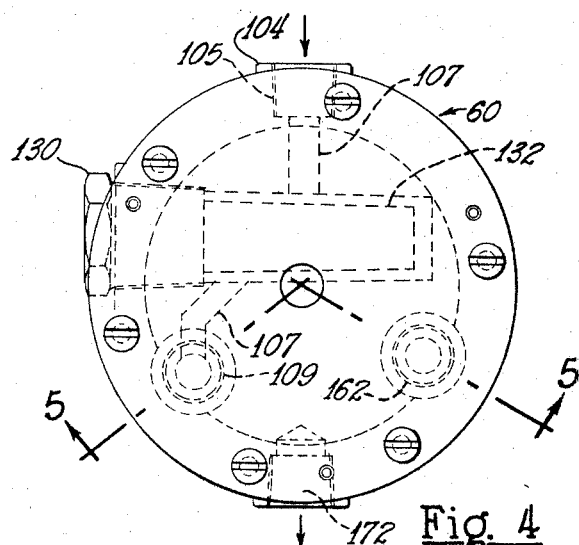
FIGURE 4 is a top plan view of the arrangement shown in FIGURE 3.
Figure 5:
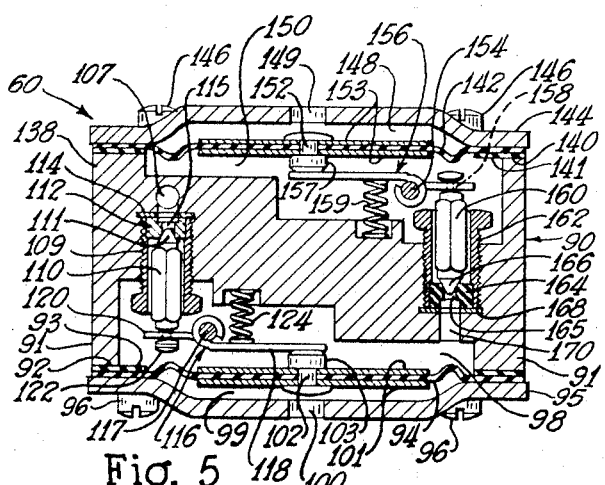
FIGURE 5 is a sectional view taken substantially on the line 5—5 of FIGURE 4.
Figure 6:
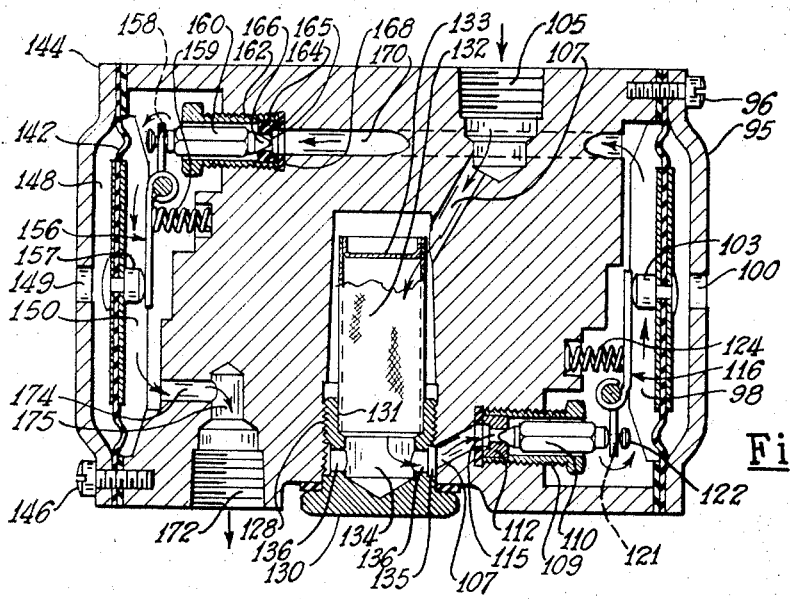
FIGURE 6 is a schematic sectional view illustrating the components of the type of unit shown in FIGURE 5.

One form of pressure actuated valve arrangement for controlling flow of liquid fuel to the burner is illustrated in FIGURES 3, 4 and 5 and a schematic sectional view of this construction is illustrated in FIGURE 6. The control arrangement in this form embodies dual fuel flow control valves and dual pressure actuated diaphragms for controlling the valves. The control arrangement 60 is inclusive of a body member or housing 90 of generally cylindrical shape. The housing is formed with a substantially annular portion 91 defining a fuel chamber 98, a planar surface 92 of the annular portion providing a seat for an annular gasket 93, a flexible diaphragm 94 engaging the gasket 93 as shown in FIGURE 5.

A circular cover plate 95 is secured to the body 90 by screws 96 threaded into suitable openings in the body 90. The diaphragm 94, which is of flexible impervious material forms a flexible wall of the fuel chamber 98. The central region of the cover 95 is recessed or shaped to provide a space or air chamber 99 to facilitate flexing movements of the diaphragm 94, the space 99 being vented to the atmosphere through a vent opening 100. The diaphragm is flanked at each side by relatively thin circular reinforcing plates 101 fashioned of thin metal or plastic material.

The diaphragm 94 and the reinforcing plates 101 are formed with aligned central openings to receive a shank of a rivet 102, the head 103 of the rivet extending into the fuel chamber 98. The diaphragm 94 may be fashioned of fabric impregnated or coated with synthetic rubber or may be formed of resinous material of a character that does not deteriorate on contact with hydrocarbon fuels. The housing 90 is provided with a boss portion 104 provided with a threaded inlet bore 105 to receive a fitting 106, shown in FIGURE 1, for connecting the conduit 56 with the control unit 60. The threaded bore 105 in the boss 104 is connected with a duct or channel 107.

Referring particularly to FIGURES 4 and 5 and to the semi-schematic view of FIGURE 6, the body 90 is provided with a threaded bore to accommodate a threaded sleeve or valve cage 109 in which is slidably disposed an inlet valve or valve member 110 provided with a cone-shaped valve portion 111 which seats in an annular seat member 112 mounted in the upper end of the valve cage 109. An annular sealing gasket 114 is disposed adjacent the inner end of the valve cage 109 to provide a seal. The body portion of the valve 110 is of polygonally-shaped cross-section, such as triangular or square shape, to facilitate flow of liquid fuel past the valve.

Disposed in the chamber 98 is a lever 116 fulcrumed upon a pin or shaft 117 carried by the body 90. The long arm 118 of the lever is adapted to be engaged by the button or head 103 of the rivet 102, the short arm 120 of the lever being engageable with the valve member 110.

The lower end of the valve body is provided with a recess forming a tenon portion 121 and the short arm 120 of the lever is forked or bifurcated to straddle the tenon portion, the recess providing a head 122.

This construction provides a positive connection between the lever and the valve member so that upward movement of the diaphragm 94, as viewed in FIGURE 5, effects counterclockwise movement of the lever 116 moving the valve portion 111 away from the seat 112 whereby fuel will flow from the inlet duct 107 through the port 115 in the valve seat 112 into the chamber 98. A resilient member or spring 124 arranged between a wall of the chamber 98 and the lever arm 118 exerts a force upon the lever normally biasing the inlet valve 111 toward the valve seat 112 to interrupt fuel flow into the chamber 98.

The semi-schematic sectional view of FIGURE 6 particularly illustrates the fuel inlet and fuel filter construction. The housing 90 is provided with a bore having a threaded portion 128 which receives a threaded plug 130. The plug 130 is provided with an interior bore 131 in which is telescoped a cylindrically-shaped screen or filter 132, the end of the screen being closed by a cup-shaped member 133. The plug 130 is provided with a counterbore 134 and a peripheral recess 135.

A plurality of circumferentially spaced radial openings 136 establish communication between the peripheral recess 135 and the counterbore 134. The peripheral recess 135 is in communication with the fuel inlet passage 107 shown in FIGURES 5 and 6 for conveying fuel to the port 115 adjacent the valve member 110.

The filter 132 illustrated herein is of fine mesh copper screen to filter foreign particles out of fuel, but it is to be understood that other types of filter may be used such as wool or other fibrous material.

The arrangement shown in FIGURES 3 through 6 is inclusive of a second valve construction arranged to be actuated by differential pressure set up by the air stream passing through the restricted passage 50 of the venturi 47 shown in FIGURE 1. The housing 90 is provided with a substantially annular portion 138 defining a second fuel chamber 150, an upper planar surface 140 of portion 138 forming a seat for a gasket 141. Engaging the gasket 141 is a second diaphragm 142 of the same character as the diaphragm 94, the diaphragm 142 forming a wall of chamber 150. A second closure plate 144 engages the diaphragm 142 and is secured to the housing by screws 146 threaded into suitable openings in the housing 90.

The central region of the closure 144 is shaped to provide a space 148 to accommodate flexing movements of the diaphragm 142. The closure 144 is vented to the atmosphere by a vent opening 149. Disposed centrally of the diaphragm 142 is a rivet 152 which extends through reinforcing discs 153 arranged at each side of the diaphragm. Fulcrumed upon a pin 154 in chamber 150 is a second lever 156, one end of the lever being arranged to be engaged by a head 157 on the rivet 152.

The short arm of the lever is bifurcated to straddle a tenon 158 formed on a valve body 160, the latter being of the same character as the valve member 110. The valve member 160 is slidably mounted within a valve cage or guide means 162 threaded into a bore in the housing 90. Arranged in the cage 162 is an annular valve seat 164 providing a port 165 into which extends a cone-shaped valve portion 166 of the valve member 160 to control fuel flow through the port 165. A sealing gasket 168 is disposed at the end of the valve cage 162. The port 165 is in communication with the chamber 98 by a passage 170.

As shown in FIGURE 6, the housing is provided with a threaded bore 172 providing an outlet which is adapted to accommodate the fitting 61 shown in FIGURE 1. The bore 172 is in communication with the chamber 148 through interconnecting channels 174 and 175. The lever 156 is biased in a direction to close the valve 166 by an expansive coil spring 159 in the same manner that the spring 124 biases the valve 111 toward closed position.

The operation of the control unit 60 with a burner arrangement as shown in FIGURE 1 is as follows: The motor 32, driving the air pump rotor 24 and the impeller 76, is energized simultaneously with the energization of the transformer 84 to initiate a spark between the points of the ignition plug 82.

The operation or rotation of the pump rotor 24 develops air under pressure in the pump outlet passage 36 providing a high velocity air stream through the restricted passage or choke band 50 of the venturi 47 developing a subatmospheric or reduced pressure at the region of the fuel delivery orifice or nozzle 40.

The subatmospheric pressure or aspiration developed at the burner nozzle 40 is communicated through the channels 66, 64, the pipe 62 and fitting 61 is transmitted through the interconnecting channels 174 and 175 to the chamber 150. Due to the differential pressures existent on opposite sides of the diaphragm 142, the atmospheric pressure in chamber 148 flexes the diaphragm 142 downwardly, as viewed in FIGURE 5, to effect counterclockwise movement of the lever 156 about the fulcrum 154 through engagement of the button 157 on the diaphragm with the long arm of the lever 156.

The area of the diaphragm 142 is sufficient whereby the atmospheric pressure acting on the diaphragm, when subatmospheric pressure exists in the chamber 150, overcomes the biasing pressure of the spring 159 to effect counterclockwise movement of the lever 156, the lever 156 multiplying the force effective to open the valve 160. The short arm of the lever 156 withdraws the valve body 160 upwardly to move the valve portion 166 out of engagement with the seat 164 to establish communication between the chamber 150 through the port 165 and passage 170 with the chamber 98 adjacent the diaphragm 94.

The areas of the diaphragm 142 and 94 subject to differential pressures are substantially the same. When subatmospheric pressure is impressed in the chamber 98 by the opening of the valve 160, the diaphragm 94, as viewed in FIGURE 5 is flexed upwardly under the influence of atmospheric pressure in the space 99. This movement causes the lever 116 to be swung in a counterclockwise direction, the button 103 on the diaphragm being engaged with the arm 118 of the lever 116. In this manner, the reduced pressure existent in the chamber 150 is also existent in the chamber 98 when the valve 160 is in open or partially open position.

As the diaphragm 94 is flexed upwardly, the valve 110, connected with the short arm 120 of the lever 116, is moved downwardly moving the valve portion 111 out of the engagement with its seat 112 to open the port 115 and admit fuel into the chamber 98 from the tank 54 through the pipe 56, fitting 106, channel 107 to the interior of the plug 130, through the filter or screen 132 and passage 115 past the valve 11. As shown in FIGURE 1, the fuel conveying tube 56 is connected with a manually operated valve 58, the latter being in normally open position to establish communication between the fuel tank and the tube 56.

As both valves 110 and 160 are thus opened through the impression of subatmospheric pressures in the chambers 150 and 98, fuel flows from the supply through the tube 56 into the inlet 105, through the filter screen 132 and passage 107, through the port 115, past the valve body 110, through the chamber 98, connecting channel 170, through the port 165, past the valve portion 166 and valve body 160, through the chamber 150, connecting channels 174 and 175 and the outlet 172, fitting 61, tube 62 and channels 64 and 66 for discharge through the fuel delivery orifice 40 into the air stream moving through the restricted region of the venturi 47.

Initial mixing of the fuel with air delivered from the pump chamber 22 of the air pump takes place in the region of the venturi 47, and additional air provided by the rotating impeller 76 flows through the openings 68 and is mixed with the fuel and air delivered from the venturi 47 to enhance more complete combustion, the burning gases moving through the sleeve 42 of burner construction shown in FIGURE 1.

Through this arrangement fuel is aspirated from the nozzle 40 only when an air stream is moving at high velocity adjacent the fuel delivery orifice 40 and the burner is in operation. In event of failure of air flow through the venturi, pressures are equalized at opposite sides of the diaphragms 94 and 142 and the normal biasing pressures of the springs 124 and 159 acting through their respective levers close both valves 110 and 160.

The control unit illustrated in FIGURES 3 through 6 embodies several features which render the construction an effective control for a combustion burner where the fuel is aspirated into an air stream to provide a combustible mixture. From the standpoint of fire hazard, it is desirable that the valve seat 112 of the first inlet valve arrangement, that is, the valve arrangement first to receive fuel from the fuel line 56, be formed of metal and the valve body 110 be formed of metal. By fashioning the valve seat 112 of metal, the seat will not be impaired or subject to failure until the entire control unit is rendered ineffective by fire.

The valve seat 164 of the second valve arrangement in the unit may be fashioned of synthetic rubber or similar material or may be fashioned of metal. It is however desirable that the second valve seat 164 be formed of yieldable material, such as synthetic rubber, as the valve portion 166 of the valve body 160 tends to seat or seal tighter in a yieldable seat than a metal valve engaging a metal seat under normal operating conditions. It is to be understood however that both valve seats may be made of metal. The inlet valve bodies 110 and 160 may be made of stainless steel, brass or other suitable material.

In the control unit of the character described wherein the first valve seat 112 is fashioned of metal, a high factor of safety is provided against fire damage and where the second seat is fashioned of yieldable material such as synthetic rubber, the tendency is to attain improved sealing characteristics with the valve member.

Where metal valve seats are used they may be made of stainless steel or brass. The springs 124 and 159 for biasing the control valves 110 and 160 toward closed position may be made of brass or stainless steel to effectively close the valves even at comparatively high temperatures.

Another feature of the dual valve control unit is that in the event a foreign particle lodges between an inlet valve and its seat, the other inlet valve arrangement will effectively prevent fuel flow when the burner is not in operation. In installations where the fuel tank 54 is disposed above the burner, the progressive lowering of the fuel level during burner operation with the flow control unit has only a minor effect on the rate of delivery of the fuel.

In installations where the fuel tank 54 is above the burner, the gravity head or fuel pressure has little or no effect on fuel delivery at the nozzle. When aspiration or reduced pressure is effective in the fuel chambers 98 and 150, air pressure at the opposite sides of the diaphragms moves the diaphragms to open the fuel inlet valves 110 and 160 to permit fuel flow to the fuel delivery nozzle 40. The nozzle construction 40 presents some restriction to fuel flow and hence a fuel back pressure is built-up in the fuel chambers 98 and 150 flexing the diaphragms in the opposite direction allowing the springs to move the valves to reduce or shut off fuel flow.

This back pressure tending to close the inlet valves prevents flooding or over delivery of fuel from the nozzle 40 as the fuel back pressure arising by nozzle restriction is effective on the full area of the diaphragms, this force moving the diaphragms away from the levers 116 and 156, permits the expansive forces of the springs 124 and 159 to tend to close the inlet valves. Where the fuel tank is disposed with respect to the burner to provide a gravity head of fuel acting against the inlet valves, the varying gravity head as fuel is consumed is changed and the fuel pressure acting to open the inlet valves is likewise changed.

As the fuel level is reduced, the fuel pressure acting to open the inlet valve is likewise reduced. As this pressure of gravity head of fuel is reduced, the aspiration in chambers 98 and 150 increases slightly and the springs 124 and 159 are further compressed to allow the valves 110 and 160 to be further opened to compensate in a measure for the reduced gravity head.

In prior control arrangements for combustion burners of the general character described, it has been conventional practice to employ a fuel bowl containing a float-controlled inlet valve which controls the delivery of fuel to a nozzle dependent upon the level of fuel in the fuel bowl, a change in the level of the fuel in the bowl influences the opening and closing of the inlet valve during burner operations, affecting variations in the rate of fuel delivered from the burner nozzle.

In the method of diaphragm control of this invention, the instant response of the diaphragm to differential pressures at opposite sides thereof provides effective control of fuel flow through the control unit.

The control unit of the invention provides a high degree of safety against fuel leakage and fire hazard. In the event of the failure of air flow at the fuel delivery nozzle irrespective of the relative position of the fuel tank with respect to the burner, pressures in the fuel chambers 98 and 150 are increased, causing the diaphragms to move in directions whereby the biasing forces of the springs 124 and 159, acting through the levers 116 and 156 immediately close the inlet valve members 110 and 160 to cut-off fuel flow from the fuel tank.

If there is a failure or fracture of a diaphragm, pressure in the adjacent fuel chamber is increased and equalized with the atmospheric pressure at the opposite side of the diaphragm and the spring immediately closes the inlet valve to prevent further delivery of fuel to the burner nozzle 40. A high factor of safety against fire hazard is attained through the control unit of the invention.

Figure 7:
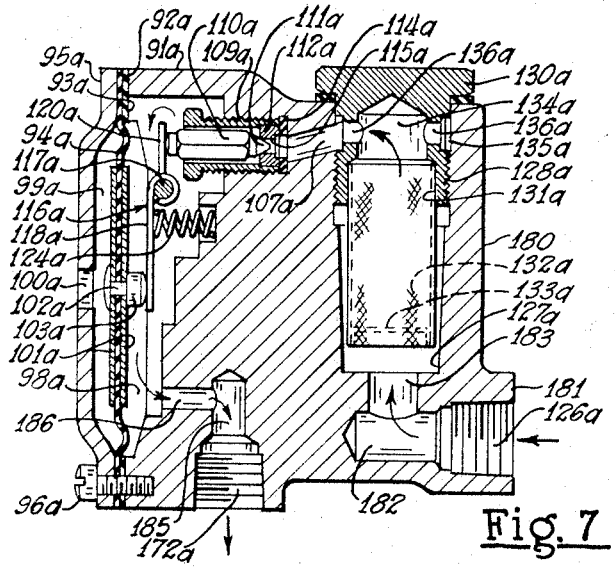
FIGURE 7 is a sectional view illustrating a liquid fuel flow control unit of the invention embodying one pressure responsive means and control valve.
Figure 8:
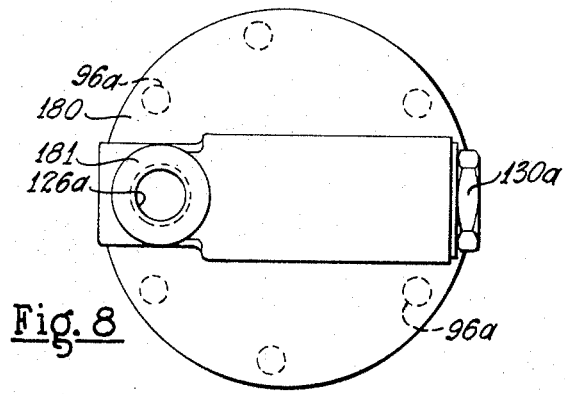
FIGURE 8 is a top plan view, on a reduced scale, of the construction shown in FIGURE 7.

FIGURES 7 and 8 illustrate a modified fuel control construction of the invention wherein a single inlet valve is controlled by differential pressures on a diaphragm. The arrangement shown in FIGURES 7 and 8 includes a body member or housing 180 having a substantially annual portion 91a defining a fuel chamber 98a, a planar surface 92a forming a seat for an annular gasket 93a which is engaged by the peripheral region of an impervious flexible diaphargm 94a forming a flexible wall of the fuel chamber 98a. The diaphragm and gasket are secured in assembled relation with the housing 180 by a closure plate 95a secured to the housing 180 by screws 96a.

The central region of the closure plate 95a is recessed or shaped to provide an air space or chamber 99a accommodating flexing movements of the diaphragm 94a, the space 99a being vented to the atmosphere through a vent opening 100a in the closure plate 95a. The diaphragm 94a is reinforced at opposite sides by metal or discs 101a. The central axis or region of the diaphragm and the discs 101a have aligned openings to accommodate a rivet 102a having a head or button 103a. The housing 180 is provided with a threaded bore receiving a tubular sleeve or valve guide member 109a in which is slidably mounted an inlet valve or valve member 110a having a cone-shaped valve portion 111a.

An annular valve seat member 112a is held in place by the sleeve 109a, an anular gasket 114a being disposed between the upper end of the guide sleeve 109a and the bottom of the bore accommodating the sleeve 109a. The annular valve seat 112a provides a port 115a cooperating with the valve portion 111a to control or regulate fuel flow into the fuel chamber 98a.

The lever 116a, disposed in the fuel chamber 98a, is fulcrumed on a pin 117a, the long arm 118a of the lever being arranged to be engaged by the button 103a carried by the diaphragm, the short arm 120a of the lever being arranged to engage the valve member or body 110a. An exansive coil spring 124a normally exerts pressure through the lever 116a biasing the inlet valve 110a toward the valve seat 112a to interrupt fuel flow through the inlet port 115a in the seat.

The housing 180 is provided with a boss portion 181 having a threaded inlet bore 126a to accommodate a fitting such as a fitting 106, shown in FIGURE 1, arranged at the end of a fuel conveying tube 56 connected with a tank 54 as shown in FIGURE 1. The inlet bore 126a is in communication with a bore 127a in the housing 180 through interconnecting passages 182 and 183. A portion of the bore 127a is threaded as at 128a to accommodate a threaded plug 130a, the plug having a bore 131a to receive a cylindrically shaped fuel filter or screen 132a, the end of the screen being closed by a cup-shaped plug 133a.

The plug 130a is provided with a counterbore 134a and a peripheral recess 135a. Transverse openings 136a establish communication between the counterbore 134a and the peripheral recess 135a, the recess being in communication with the valve port 115a by a channel or duct 107a. The housing 180 is fashioned with a threaded outlet bore 172a in communication with the fuel chamber 98a through interconnecting passages 185 and 186. The outlet bore 172a is adapted to accommodate a fitting, such as fitting 61 shown in FIGURE 1, for conveying fuel from the chamber 98a to the fuel delivery nozzle 40 of the burner, shown in FIGURE 1.

The control unit, shown in FIGURES 7 and 8, is arranged to be connected in the fuel supply system, shown in FIGURE 1, in the same position as the unit 60. Fuel from the tank 54 is conveyed through the tube 56, fitting 106 and through the inlet bore 126a, interconnecting passages 182 and 183, through the screen or filter 132a, through the counterbore 134a, passages 136a and 107a and past the valve member 110a whenever aspiration at the burner nozzle is effective in the fuel chamber 98a to set up reduced pressure therein.

Such reduced pressure is effective through the outlet bore 172a and interconnecting passages 185 and 186 in the chamber 98a to cause the diaphragm to move or flex in a right-hand direction, as viewed in FIGURE 7.

Such movement of the diaphragm swings the lever 116a about its fulcrum 117a in a counterclockwise direction to permit the valve member 110a to move in a left-hand direction withdrawing the needle valve portion 111a from its seat to thereby effect fuel flow into the chamber 98a and its continued delivery to the fuel delivery nozzle 40 shown in FIGURE 1.

The filter 132a screens out foreign matter that may be in the liquid fuel to minimize the liability of foreign particles lodging on the valve seat 112a. In this form of control unit where a single diaphragm actuated valve controls fuel flow to the burner nozzle, the valve seat 112a should be made of metal, such as stainless steel or brass, to resist high temperatures and reduce liability of damage by fire.

It should be noted that the short arm 120a of the lever is in contacting engagement with the valve so that when the diaphragm 94a is flexed, by aspiration or reduced pressure, in a right-hand direction, as viewed in FIGURE 7, the short arm of the lever moves in a left-hand direction and the valve member 110a is withdrawn under the influence of the reduced pressure in the chamber 98a to admit fuel flow past the inlet valve into the chamber. Thus, if the fuel tank 54, shown in FIGURE 1, is below the burner, the greater reduced pressure in the fuel chamber 98a causes the valve member 110a to be opened further.

If the fuel tank 54 is above the burner and a gravity head of fuel is existent in the channel 107a and the port 115a, the valve member 110a will be influenced toward open position by the reduced pressure existent in chamber 98a under the influence of aspiration and, in addition, the gravity or pressure head of fuel on the inlet valve tends to move the valve toward open position.

Where a single diaphragm and inlet valve control mechanism is employed of the character shown in FIGURES 7 and 8, any impairment or failure of aspiration at the burner nozzle effects an increase in pressure in the chamber 98a, the diaphragm is flexed in a left-hand direction, as viewed in FIGURE 7, and the spring 124a is effective through the lever 116a to close the fuel inlet valve 110a. In the event that the diaphragm 94a becomes fractured or impaired and pressure in the fuel chamber 98a is increased by air flow through a fracture in the diaphragm, the spring 124a is automatically effective to close the fuel inlet valve 110a to interrupt fuel flow to the burner.

Thus, a single diaphragm and fuel inlet valve arrangement, shown in FIGURES 7 and 8, is effective to interrupt fuel flow except during burner operation when aspiration is effective on the fuel delivery nozzle 40. Fuel will only be delivered from the nozzle 40 when differential pressures are established at opposite sides of the diaphragm 94a.

Figure 9:
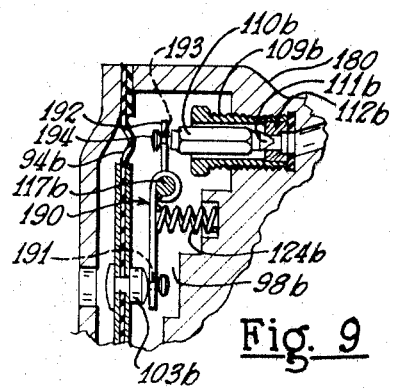
FIGURE 9 is a fragmentary detail sectional view illustrating a fuel inlet valve and diaphragm control means therefor.

FIGURE 9 is a sectional view of a portion of the construction shown in FIGURE 7 illustrating a shackle connection between the lever and the valve and between the diaphragm button and the lever. In this form, the valve guide 109b in a bore in the housing 180 slidably accommodates an inlet valve member 110b. The diaphragm 94b is equipped with a rivet having a head 103b fashioned with a tenon 191 which is straddled by the bifurcated or forked end of the long arm of a lever 190 fulcrumed on a pin 117b. The short arm 192 of the lever is bifurcated and the furcations straddle a tenon 193 formed by a recess in the valve member 110b, the recess in the valve member providing a head 194 on the valve 110b.

The shackle connection of the diaphragm button 103b with the lever and the shackle connection of the short arm of the lever with the tenon 193 on the valve member provides a positive connection whereby movement of the lever 190 in either direction effects movement of the valve member 110b. In the event that a foreign particle lodges under the valve, fuel flowing into the fuel chamber increases the pressure which increases the valve-closing effort applied to the inlet valve through the lever. The valve member 110b is normally biased under the influence of an expansive coil spring 124b to engage the cone-shaped valve portion 111b with the valve seat 112b.

The shackle connection, provided between the lever and the valve member, eliminates any tendency for the valve to stick in the valve seat. The arrangement of FIGURE 9 operates in the same manner as the construction shown in FIGURE 7.

FIGURES 10 through 13 illustrate another form of dual valve construction for controlling fuel flow to a combustion burner, the construction embodying a modified form of filter or strainer.

In this form the control unit includes a housing 200 similar to the housing 90, shown in FIGURE 5, formed with fuel chambers 98c and 150c, a wall of chamber 98c being provided by a flexible diaphragm 94c, and a wall of the chamber 150c being provided by a flexible diaphragm 142c. Diaphragm 94c controls an inlet valve member 110c through the lever 116c, the valve member 110c being slidable in a valve guide 109c and is normally biased toward closed position under the influence of an expansive coil spring 124c.

The short arm of the lever 116c is connected with the valve member 110c by a shackle connection of the character shown in FIGURES 5, 6 and 9. The diaphragm 142c controls the second valve member 160c through the lever 156c, the valve member being slidable in a sleeve or valve guide 162c. A spring 159c normally biases the valve member 160c toward closed position. The valve members respectively cooperate with valve seats 112c and 164c. It is preferable that the valve seat 112c be formed of metal in order to resist high temperatures. The valve seat 164c may be fashioned of metal or nonmetallic material such as synthetic rubber.

The diaphragm 94c is secured to the housing by a cover plate 95c secured in place by screws 96c, a gasket being disposed between the housing and the diaphragm. The plate 95c is provided with a vent opening 100c. Disposed adjacent the diaphragm 142c is a circularly-shaped member 202 having a planar peripheral surface engaging the diaphragm 142c, a gasket being disposed between the housing 200 and the diaphragm, and the member 202 being secured to the housing 200 by means of screws 204.

The member 202 is fashioned with an annular chamber or region 206 which is in communication with a fuel duct or passage 208, the fuel passage 208 being in registration with a passage 210 formed in the housing 200. A short tube 211 is snugly fitted into the passage 210 to prevent fuel leakage in event of impairment of or damage to the diaphragm 142c or the adjacent gasket. A passage 212 is drilled in the housing 200 and the outer end closed by a plug 214. The drill passage 212 is in communication with the port in the valve seat 112c and with the passage 210 whereby fuel flows from the chamber 206 through passage 208, 210 and 212 to the region of the inlet valve 110c. The member 202 is fashioned with a central boss portion 216 fashioned with a ledge 217. The member 202 is provided with a circular recess 218, and disposed in the recess 218 and engaging the circular ledge 217 is a screen or filter 220 of fine mesh wire or other suitable filtering material. The member 202 is formed with a counterbore adapted to accommodate a sealing gasket 222 which engages the peripheral region of a major surface of the screen 220. A circular closure member 224 has a surface 226 engaging the sealing gasket 222. The boss portion 216 is provided with a threaded bore to accommodate the threaded portion of a securing bolt 228 which extends through an opening in the member 224 and is adapted to secure the member 224 in snug engagement with the sealing gasket 222 to form a seal.

A seal gasket 229 is disposed adjacent the head of the bolt 228 to provide a liquid tight seal. The member 202 is shaped with a recess providing an air space 230 to accommodate flexing movements of the diaphragm 142c. The gaskets 222 and 229 are made of soft copper or other heat resistant material.

Figure 11:
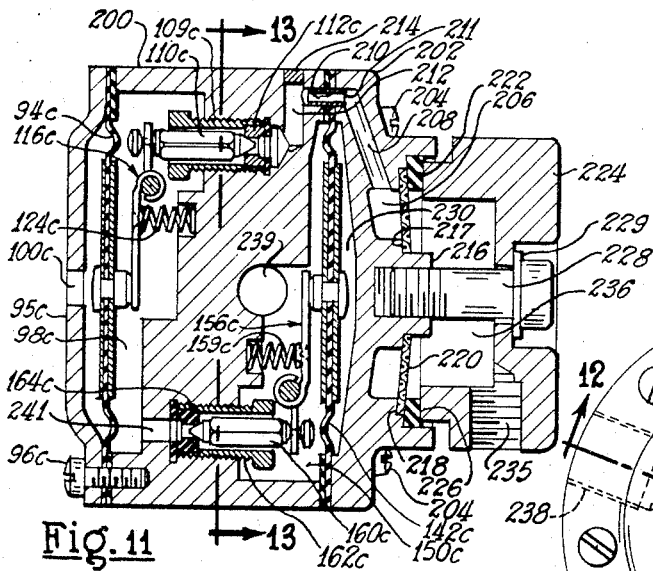
FIGURE 11 is a sectional view illustrating the dual fuel control mechanism embodying a fuel filter construction shown in FIGURE 10.
Figure 12:
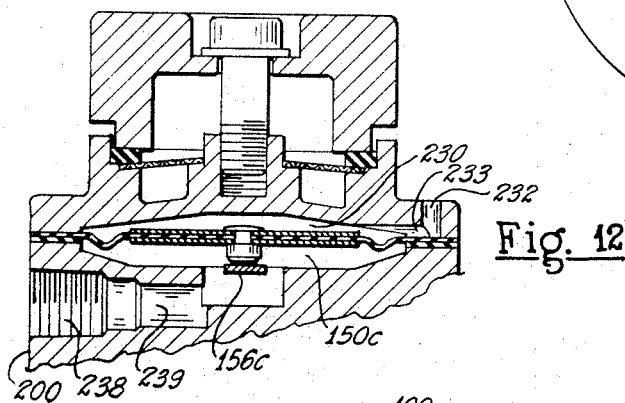
FIGURE 12 is a fragmentary sectional view taken substantially on the line 12—12 of FIGURE 10.
Figure 13:
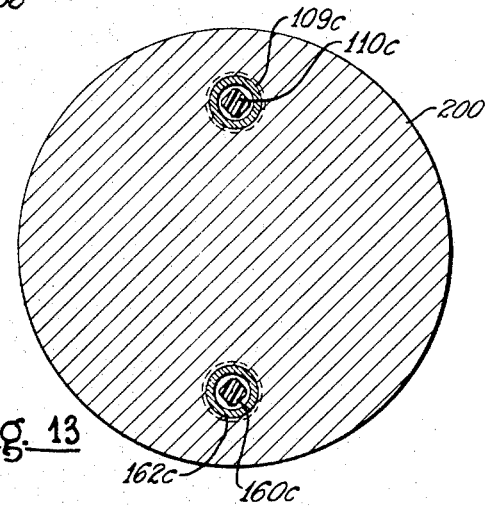
FIGURE 13 is a sectional view taken substantially on the line 13—13 of FIGURE 11.

The space 230 is vented to the atmosphere through a vent means including a passage 232 in communication with a passage 233 opening into the air chamber 230, shown in FIGURE 12. The member 224 is provided with a threaded bore 235 in communication with a chamber 236 above the screen or filter 220 as shown in FIGURE 11.

Figure 10:
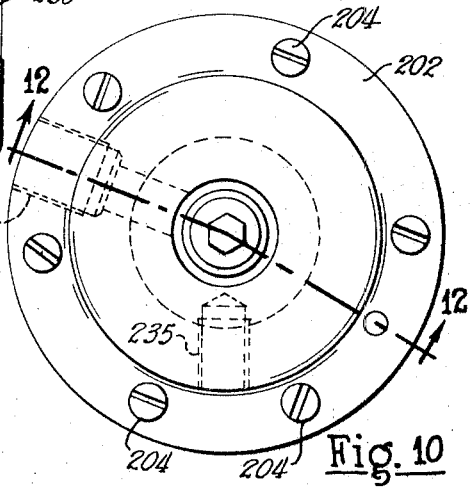
FIGURE 10 is a top plan view of a form of duel control mechanism embodying a fuel strainer.

The threaded bore 235 is adapted to accommodate an inlet fitting such as the fitting 106 shown in FIGURE 1 connected by a tube 56 with a fuel tank or fuel source. As shown in FIGURES 10 and 12, the housing or member 200 is provided with a threaded bore 238 which is in communication with the fuel chamber 150c through a passage 239. The threaded bore 238 accommodates an outlet fitting such as the fitting 61 shown in FIGURE 1, which in turn is connected with the fuel delivery orifice 40 of a burner.

In the operation of the control unit shown in FIGURES 10 through 13, aspiration or reduced pressure established adjacent the fuel delivery orifice of the burner is transmitted to the fuel chamber 150c through passages 238 and 239. By reason of the establishment of differential pressures at opposite sides of the diaphragm 142c the diaphragm is moved or flexed in a left-hand direction as viewed in FIGURE 11, pivoting the lever 156c in a counterclockwise direction to move the valve member 160c to open position. The port in the valve seat 164c is in communication with the fuel chamber 98c through a passage 241.

Aspiration or reduced pressure is transmitted through the port in the valve seat 164c and passage 241 to the fuel chamber 98c. Reduced pressure in the fuel chamber 98c causes atmospheric pressure to flex the diaphragm 94c in a right-hand direction as viewed in FIGURE 11.

effecting counterclockwise pivotal movement of the lever 116c to open the valve member 110c by moving the valve member away from the valve seat 112c, admitting fuel from a fuel tank through communicating passageways 212, 210, 208, annular chambers 206 and 236, inlet 235 and fuel conveying tube 56, shown in FIGURE 1.

The incoming fuel from the tank flows through the screen 220, past the valves 110c and 160c in sequence and through the outlet 238 to the burner nozzle 40, shown in FIGURE 1. In the construction shown in FIGURES 10 through 13, the strainer and inlet passage arrangement is contained in the members 202 and 224, a construction which enables the use of a generally planar type of screen or filter 220.

FIGURES 14 and 15 illustrate a further form of dual valve control mechanism in combination with a fuel filter or strainer of modified construction. In the construction shown in FIGURES 14 and 15 the dual valve mechanisms and their associated diaphragms are arranged in side-by-side relation. The fuel flow control mechanisms are contained within an elongated housing 250 fashioned with spaced fuel chambers 252 and 254.

A flexible diaphragm component 255 forms a wall of the fuel chamber 252, and a second diaphragm component 257 forms a flexible wall of the second fuel chamber 254. The diaphragm components 255 and 257 are illustrated as formed of a single member of impervious flexible material, such as synthetic rubber or flexible textile or cloth impregnated with an impervious coating, but it is to be understood that the diaphragm components 255 and 257 may be fashioned as two independent diaphragms. A gasket 259 is disposed between the peripheral regions of the diaphragm components and a planar upper surface area of the housing 250 to provide a seal between the housing and the diaphragms. A cover plate 260 embraces or covers both diaphragm components, the plate being secured to the housing 250 by screws 262.

As particularly illustrated in FIGURE 15, the plate 260 adjacent the diaphragms or diaphragm components 255 and 257 is fashioned with raised portions 264 and 266 providing chambers 269 and 270 to facilitate upward flexing movements of the diaphragms. The raised portions 264 and 266 are provided respectively with vent openings 267 and 268 whereby the spaces or chambers 269 and 270 are vented to the atmosphere.

The housing 250 is provided with a boss portion 272 having a threaded inlet bore 273 adapted to receive a component 274 of a union or coupling 275. The housing 250 is fashioned with a threaded bore accommodating a sleeve or valve cage 276 in which is slidably disposed an inlet valve or valve member 278.

The member 276 is fashioned with an inwardly extending flange or shoulder 279 defining an opening through which extends a stem portion 281 integrally formed on the valve 278.

The valve is provided with a cone-shaped valve portion adapted to engage the flange 279, the latter forming a seat for the cone-shaped valve portion. The lower end of member 276 engages a sealing gasket 283. The valve 278 is provided with an axial recess to accommodate an expansive coil spring 286, the lower end of the spring engaging in a recess 287 formed in the housing 250. A fuel channel or passage 288 is formed in the housing in communication with the inlet bore 273 for conveying liquid fuel to the region adjacent the valve member 278.

The flexible diaphragm component 255 is flanked at each side with reinforcing discs 290 and a rivet 292 disposed centrally of the diaphragm and extends through aligned openings in the diaphragm and the reinforcing discs to secure the diaphragm component and reinforcing discs in assembled relation. The central axis of the diaphragm component 255 is aligned with the axis of the valve member 278 and its stem 281.

The end of the stem 281 is adapted to be engaged by the rivet 292 carried by the diaphragm whereby downwardly flexing movements of the diaphragm component 255 as viewed in FIGURE 15 moves the valve member 278 away from the valve seat 279 to facilitate flow of fuel upwardly past the valve member 278 and through the valve port defined by the ledge or seat 279 into the fuel chamber 252.

The arrangement is inclusive of a second valve construction adapted to be actuated or influenced by flexing movements of the second diaphragm component 257.

The second diaphragm component 257 is flanked at each side with reinforcing discs 294 secured to the diaphragm by a rivet 295. The housing 250 is provided with a threaded bore 293 accommodating a valve guide sleeve or cage 296, the axis of which is aligned with the rivet 295. Slidably disposed in the valve guide 296 is a valve 298 of the same construction as the valve 278. The hollow interior of the valve guide 296 is fashioned with an inwardly extending flange 300 which forms an abutment for an annular valve seat 302.

The valve seat 302 for the second valve 298 is preferably fashioned of synthetic rubber or other yieldable material which is engaged by a cone-shaped portion of the valve 298. The valve 298 is formed with a stem 304 arranged to be engaged by the rivet 295 whereby downward flexure or movement of the diaphragm component 257 moves the valve 298 downwardly to open the port provided in the valve seat 302. The valve member 298 is formed with a recess accommodating an expansive coil spring 306, a recess 307 in the housing 250 accommodating the lower end of the spring 306.

The housing 250 is provided with a fuel passage or duct 308 in communication between the region adjacent the lower end of the valve 298 and the fuel chamber 252 adjacent the diaphragm component 255.

Liquid fuel in the chamber 252 is conveyed by duct 308 to a region adjacent the valve member 298 so that when the valve 298 is opened, fuel flows past the valve 298 into the second fuel chamber 254. A threaded outlet bore in the housing 250 is in communication with the fuel chamber 254 by a passage 312. The bore 310 accommodates a fitting 61, shown in FIGURE 1, whereby fuel is conveyed through the arrangement shown in FIGURE 1 connected with the fitting 61 to the burner nozzle 40.

The dual valve construction shown in FIGURES 14 and 15 is provided with a fuel filter or strainer construction to filter out foreign matter that may be in the liquid fuel. The fuel filter arrangement is inclusive of a body member 315 provided with a threaded inlet bore 317 which is adapted to accommodate a fitting, such as the fitting 106 shown in FIGURE 1 for connection with a fuel supply tube from a fuel tank. The body 315 is provided with a depending boss portion 318 fashioned with a circular ledge 319.

The body 315 is fashioned with a circular recess 320. A circular fine mesh screen or similar filter medium 322 has a central opening of a size whereby the screen seats against the ledge 319, the periphery of the screen fitting in the peripheral recess 320. An annular gasket 324 of rubber or other suitable sealing material engages the opposite peripheral surface of the screen 322, as shown in FIGURE 15. A cup-shaped member 326 formed of metal is disposed beneath the body 315 and is fashioned with an outwardly extending peripheral flange 328 which engages the sealing gasket 324 fashioned of soft copper or suitable heat resistant material.

Depending from the cup-shaped member 326 is a circular collar-like portion 330 which engages in a recess of a member 332, the reces being defined by an inner flange 333 and an outer flange 334. The inner flange 333 defines a central threaded opening which receives a threaded member 335 provided at its lower end with a slot 336 which accommodates a wire bail 338. The bail 338 is of generally U-shaped configuration and has its end regions 339 bent to engage in recesses 340 formed in the upper portion of the housing 315 at diametrically arranged regions of the housing, as shown in FIGURE 14.

The member 334, having threaded engagement with the threaded member 335, is rotatable and may be manipulated to exert upward pressure upon the cup 326 to hold the flange 328 thereof in sealing engagement with the gasket 324. The cup-shaped member 326 may be removed for cleaning by rotating the member 332 in a direction to lower the member 332 out of engagement with the collar 330 depending from the cup 326. The threaded inlet bore 317 is in communication with a valve chamber 341, a counterbore 342 in the body 315 forming a seat or ledge 343 which is adapted to be engaged by a manually operable valve member 344 carried on a threaded valve stem 345, the latter having a manipulating handle 346.

A fitting 348 is threaded into a bore in the body 315 and is interiorly threaded to accommodate the threaded portion of the stem 345. A sealing gasket 350, secured in place by a retainer 351, engages the valve stem to prevent leakage of fuel along the stem.

When the valve stem is rotated in a direction to engage the valve 344 with the seat 343, fuel flow is interrupted into the fuel bowl 326. A passage 352 in the boss portion 318 is in communication with passage 342 for conveying liquid fuel from the supply into the bowl 326, the fuel flowing upwardly through the screen 322 and through the coupling 275 to the first control valve 278 in the housing 250.

In the construction shown in FIGURES 14 and 15, the diaphragms or diaphragm components 255 and 257 act directly upon the valves 278 and 298, and the expansive force of each of the springs 306 is preferably less than that of the springs employed with the motion transmitting lever constructions in the forms of the invention hereinbefore described so that the valves will be readily opened under the influence of aspiration or reduced pressure established adjacent the burner nozzle, shown in FIGURE 1. It should be noted that the valve seat 302 is preferably made of rubber or yieldable material to obtain an effective seating engagement with the cone-shaped portion of the valve 298.

In the arrangement shown in FIGURES 14 and 15 and the constructions hereinbefore described wherein the control valves are normally biased toward closed position under the influence of springs or resilient means, the control units are operable in any position.

With the diaphragms arranged above the valves, as shown in FIGURE 15, the diaphragms are not subjected to the weight of fuel in the fuel chambers except when the arrangement is used in inverted position.

FIGURE 16 is a longitudinal sectional view of a dual valve construction similar to the construction shown in FIGURE 15 but without valve biasing springs. In the arrangement shown in FIGURE 16, the unit is positioned so that the diaphragms are beneath the valves whereby the gravity head of fuel from the supply tank provides the biasing force for normally urging the valves toward closed position. The construction is inclusive of a housing 354 fashioned with fuel chambers 252' and 254', a flexible diaphragm component 255' forming a flexible wall of the chamber 252', and the flexible diaphragm component 257' forming a flexible wall of the fuel chamber 254', the diaphragms being flanked with reinforcing discs.

As in the construction shown in FIGURE 15, the diaphragm components are integrated of a single sheet of material, but it is to be understood that the diaphragm components may be independent members, if desired. The diaphragm components are held in place by a closure member 260' secured by screws 262'. The closure 260' is fashioned with raised portions 264' and 266' adjacent the regions of the diaphragms providing spaces 269' and 270' to accommodate flexing movements of the diaphragms, the portions 264' and 266' being vented through openings 267' and 268'.

The housing 354 is formed with a threaded bore accommodating a valve guide member or cage 276' in which is slidably mounted a valve member 356. The axis of the valve 356 is aligned with the rivet 292' carried by the diaphragm component 255'. The valve member 356 is provided with a stem 357 adapted to be directly engaged by the rivet 292' when the diaphrgam component 255' is flexed upwardly to move the cone-shaped valve portion of the valve 356 away from the annular valve seat 359 provided by a circular ledge 279' formed interiorly in the valve cage 276'.

The housing 354 is provided with a threaded inlet bore 362 in communication with a passage 363 adjacent the upper end of the valve 356. The inlet bore 362 is adapted to accommodate a fitting of the character shown at 106 in FIGURE 1 for connection with a fuel supply tube 56 connected with a fuel tank 54 as in FIGURE 1. In the form of control unit shown in FIGURE 16, the fuel tank is disposed above the unit whereby a gravity head of fuel is effective on the valve member 356 biasing the valve member toward closed position.

The housing 354 is formed with a second threaded bore accommodating a valve guide or cage 296' in which is slidably disposed a valve 365 provided with a cone-shaped valve portion adapted to seat against an annular rubber seat 302' disposed adjacent an abutment 300' provided interiorly of the valve cage 296'.

The valve 365 is provided with a stem 367 adapted to be engaged by a rivet 295' carried by the diaphragm component 257'. A chamber 368, at the upper end of the bore accommodating the valve guide 296', is connected with the fuel chamber 252' by a fuel passage or duct 369.

The housing 354 is provided with a threaded outlet duct 370 adapted to accommodate a fitting, such as fitting 61 shown in FIGURE 1, and the associated fuel conveying arrangement of FIGURE 1 for delivery of fuel to the burner nozzle 40. The outlet bore 370 is in communication with the chamber 254' by a passage 372. It should be noted that with the diaphragms or diaphragm components 255' and 257' disposed below the valve members and below the fuel supply tank, fuel in the passage 363 adjacent the valve 356 normally biases the valves toward closed positions when there is fuel in the unit.

In the operation of the arrangement shown in FIGURE 16, aspiration or reduced pressure at the fuel delivery nozzle 40 is transmitted through the passages 370 and 372 to the fuel chamber 254'. Reduced pressure therein effects upward movement of the diaphragm component 257', moving the valve member 365 away from its seat 302' whereby the reduced pressure is communicated to the fuel chamber 252' through the connecting passageway 369.

Reduced pressure in the fuel chamber 252' causes atmospheric pressure to flex the diaphragm component 255' upwardly, moving the valve 356 away from its seat 359 and permitting fuel to flow from the fuel tank through the inlet passages 362 and 363 'into the fuel chamber 252', thence through the channel 369, past the valve 365 into the fuel chamber 254' and through the outlet passage 370 for delivery through the main nozzle 40, shown in FIGURE 1. As the fuel chambers 252' and 254' are unvented, fuel flow to the burner nozzle will continue only so long as reduced or differential pressure exists within the fuel chambers 252' and 254'.

In the event of failure of aspiration at the main nozzle, the pressure in the chambers 252' and 254' becomes atmospheric and the gravity head of the fuel causes the valve 356 to seat and interrupt fuel flow into the first chamber 252'. As the diaphragm 257' has moved downwardly by pressure equalization at opposite sides of this diaphragm, the valve member 365 engages the seat 302'. In the event of fracture of either of the diaphragm components 255' or 257', pressure is immediately equalized on opposite sides of the fracture diaphragm and the adjacent valve member will be closed by fuel pressure.

The arrangement shown in FIGURE 16 is adapted for effective use when the diaphragms are in substantially horizontal positions and the valves in substantially vertical positions and above the diaphragms in order that the gravity head or fuel pressure is effective to exert closing effort on the valves.

FIGURES 17 and 18 illustrate another form of liquid fuel control unit of the invention, this unit being of the single inlet valve type. The unit includes a housing 376 having a circular portion 377 which is engaged by an annular sealing gasket 378, the annular region of a flexible diaphragm 379 engaging the gasket 378. A closure plate 380 holds the gasket and diaphragm in assembled relation and is secured to the body 376 by screws 381. The diaphrgam 379 is made of material which is impervious or coated to render it impervious.

The closure plate 380 is recessed or depressed adjacent the diaphragm to provide a space or air chamber 382 to accommodate flexing movements of the diaphragm, the space 382 being vented to the atmosphere through a vent opening 383 in the closure plate 380. The opposite sides of the diaphrgam 379 are flanked with reinforcing discs 384, the discs and diaphragm being held in assembled relation by a rivet 385 having a head or button 386. The circular portion 377 of the housing defines a fuel chamber 387 which is in communication with a threaded outlet bore 388 by communicating passages 389 and 390.

The housing or body 376 is fashioned with a boss 392 having a threaded inlet bore 393. The inlet bore 393 is in communication with a smooth bore 395 in the housing, the bore 395 slidably accommodating a valve or valve member 396 of polygonal cross section formed with a cone-shaped valve portion 397 and a valve stem 398.

The smooth bore 395 in the boss 392 terminates in an inwardly extending ledge or flange 399 which forms a seat for the valve portion 397, the flange defining an opening 400 through which extends the valve stem 398. Mounted in the fuel chamber 387 is a shaft or pin 402 which forms a fulcrum for one end of a lever 404.

The distal end of the lever is arranged to be engaged by the button 386 mounted by the diaphragm, the valve stem 398 engaging the lever at a region intermediate the lever fulcrum and the point of engagement of the lever with the diaphragm button 386. A perforated retainer or grid 405 is positioned in the bore 395 above the valve 396 to prevent dislodgement of the valve in an upward direction. In this form of the invention, the inlet fuel pressure provides the force normally biasing the valve 396 toward closed position. The inlet opening 393 receiver a fitting, such as fitting 106 shown in FIGURE 1, connected by a tube with 54 with a fuel supply.

Aspiration at the burner nozzle, such as nozzle 40 shown in FIGURE 1, is transmitted through the opening 388 and communicating passages 389 and 390 to the fuel chamber 387, the reduced pressure or differential pressure in the fuel chamber causes the diaphragm 379 to be raised upwardly by atmospheric pressure in the space 382. The button 386, engaging the lever 404, moves the lever in a counterclockwise direction about its fulcrum 402 elevating the valve member 396 away from its seat and permitting liquid fuel to flow past the valve member, through the opening 400 and through the fuel chamber 387 for delivery to the burner nozzle.

Failure of aspiration causes equalization of pressure at each side of the diaphragm and the weight of the valve member 396 together with the gravity head of incoming fuel perssure causes the valve portion 397 to engage its seat and interrupt fuel flow to the burner. The arrangement shown in FIGURE 18 is adapted for use in the position wherein the valve 396 is in a vertical position above the diaphragm and with the fuel supply tank above the control unit in order to provide gravity head to close the valve member. If the diaphargm becomes fractured or the pressures become equalized on each side of the diaphragm, the diaphragm returns to its normal position with the valve portion 397 engaging the valve seat 399 to interrupt fuel flow to the burner.

FIGURE 19 illustrates a construction similar to that shown in FIGURE 18 with a modified lever arrangement. The housing 409 is fashioned with an annular boss portion 377a formed with a planar surface on which is fitted a gasket 378a. The peripheral region of a flexible diaphragm 379a is disposed contiguous with the gasket 378a. A closure plate 380a engages the peripheral region of the diaphragm, the plate being secured to the housing 409 by screws 381a.

The central region of the closure plate 380a is recessed or depressed providing a space or air chamber 382a to accommodate flexing movements of the diaphragm 379a, the plate having a vent 383a open to the atmosphere.

Reinforcing discs 384a are disposed at opposite sides of the diaphragm and are secured to the diaphragm by a rivet 385a, the rivet having a head or button 386a. The annular portion 377a of the housing defines a fuel chamber 387a, the diaphragm 379a forming a wall of the chamber. The boss portion 392a is fashioned with a threaded inlet bore 393a which is in communication with a smooth bore 395a of lesser diameter.

Slidably disposed in the smooth bore 395a is an inlet valve 396a having a cone-shaped valve portion 397a terminating in a stem 398a. The valve portion 397a, seats against a ledge 399a defining an opening 400a accommodating the valve stem 398a. Mounted in the fuel chamber 387a is a shaft or pin 402a providing a fulcrum for a lever 408. The button or rivet head 386a mounted by the diaphragm is adapted to engage the lever 408 intermediate its ends.

The distal end of the lever 408 is adapted to engage the valve stem 398a. A perforated member or grid 405a is fixedly disposed in the upper end of the smooth bore 395a to prevent dislodgement of the valve member 396a. The housing 409 is fashioned with a threaded outlet bore 410 which is in communication with the fuel chamber 387a by connecting passages 411 and 412.

The control unit shown in FIGURE 19 functions in substantially the same manner as the unit shown in FIGURE 18. Aspiation or reduced pressure is transmitted from a burner nozzle such as nozzle 40 shown in FIGURE 1, through the outlet bore and passages 411 and 412 to the fuel chamber 387a.

Reduced pressure in the latter chamber causes atmospheric pressure to elevate the diaphragm 379a and move the valve member 396a to open position to admit fuel from a supply through the inlet bore 393a into the fuel chamber 387a for delivery to the burner nozzle. In event of failure of aspiration or impairment or fracture of the diaphragm, the pressures at opposite sides of the diaphragm are equalized and the valve 396a closes under fuel pressure thereby preventing further flow of liquid fuel through the unit.

FIGURE 20 illustrates a control valve arrangement of the character shown in FIGURE 18 with a spring means for biasing the valve toward closed position. The boss portion 392' of the housing or body 376 has an inlet bore 393' in communication with a smooth bore 395', the valve member 396' being slidably mounted in the bore 395'. A grid or perforated member 405 is disposed above the valve and an expansive coil spring 407 is disposed between the grid and the valve member for exerting a resilient biasing force urging the valve toward closed position.

A spring may be embodied in the construction shown in FIGURE 19. When the construction shown in either of FIGURES 18 or 19 is modified as shown in FIGURE 20, with a spring biasing means for the valve, the control unit may be disposed in any position because the spring is effective in any relative position to bias the valve closed.

FIGURE 21 illustrates another form of control unit of the invention. A housing or body member 415 is fashioned with a fuel chamber 416 defined by a circular portion 417. An annular gasket 418 is disposed on a planar surface of the portion 417 and a flexible diaphragm 419 has its peripheral region engaging the gasket 418, the diaphragm defining one wall of a fuel chamber 416. A closure plate 420 encloses the diaphragm and the peripheral region of the plate is secured to the body 415 by screws 421.

The central region of the plate 420 is depressed or recessed to provide a space 422 to accommodate flexure of the diaphragm 419, the space 422 being vented to the atmospere through an opening 423 in the plate 420. The diaphragm is flanked at each side by reinforcing discs 424 which are secured to the diaphragm by a rivet 425 having a head or button 426. The housing 415 has a threaded inlet bore 428 in communication with a passage 429. The housing is provided interiorly with a threaded bore accommodating a valve cage or guide 430 having an inwardly extending flange forming a valve seat surface 431, the member 430 having a port 432 in communication with the passage 429.

A sealing gasket 433 is disposed between the upper end of the valve cage 430 and the flange forming the valve seat. Slidably mounted within the hollow interior of the sleeve 430 is a valve 435 having a cone-shaped valve portion 436 arranged for cooperation with the valve seat 431. Disposed in the lower end of the sleeve or valve cage 430 is a perforated member or grid 437, and the valve 435 is provided with a flange or shoulder 438.

Disposed between the perforated member 437 and the shoulder 438 on the valve member is an expansive coil spring 439 which biases the valve portion 436 into engagement with the valve seat 431. Mounted on the housing 415 is a pin 440 upon which a lever 441 is fulcrumed intermediate its ends. The end region of the long arm of the lever is forked or bifurcated to straddle a tenon 442 formed on the button portion 426 of the rivet mounted by the diaphragm. Through this arrangement movements of the diaphragm effect positive movements of the lever 441.

The short arm of the lever 441 is bifurcated and arranged to straddle a tenon 443 formed on the valve 435 thereby forming a shackle or positive connection between the lever and the valve 435. The spring 439 normally biases the valve toward closed position but the valve is positively opened by flexing movements of the diaphragm by reason of the shackle or articulated connection between the short arm of the lever and the valve member 435.

The housing 415 is provided with a threaded outlet bore 445 arranged to be connected with a fitting such as fitting 61, shown in FIGURE 1, and the tubular arrangement, shown in FIGURE 1, for conveying liquid fuel to a burner nozzle.

The outlet bore 445 is in communication with the fuel chamber 416 by connecting passageways 446 and 447 whereby aspiration at the burner nozzle is transmitted to the fuel chamber 416, setting up differential pressures at opposite sides of the diaphragm 419 whereby the diaphragm is flexed upwardly and, through the medium of the lever 441, the inlet valve 435 is opened to admit fuel flow from the supply through the control unit. As the fuel inlet valve 435 is normally biased toward closed position by the spring 439, the unit may be disposed in any angular or inverted position and operate satisfactorily.

FIGURE 22 illustrates a modified form of control unit of the invention wherein the inlet valve is normally biased toward closed position by the force of a spring, the inlet valve opening against fuel pressure of the supply. The body member or housing 450 is fashioned with a substantially annular portion defining a fuel chamber 451, the annular portion providing a seat for an annular gasket 452, the peripheral region of an impervious flexible diaphragm 453 being disposed in engagement with the gasket, the diaphragm forming a flexible wall of the chamber 451. A closure plate 454 engages the diaphragm and secures the same in assembled relation with the housing 450 by screws 455.

The central region of plate 454 is shaped to provide an air space 456 to accommodate movements of the diaphragm, the space 456 being vented to the atmosphere through a vent opening 457 in the plate 454.

The diaphragm is flanked at opposite sides by metal reinforcing discs 458 secured to the diaphragm by a rivet 459 having a head portion or button 460. The body 450 is provided with a threaded inlet bore 462 which is in communication with a second threaded bore, the latter accommodating a bushing 463.

A bore 464 in housing 450 accommodates a valve guide or sleeve 465 having an inwardly extending flange 466 forming a valve seat and defining a port 467. Secured within a counterbore in the sleeve 465 is a perforated valve guide member 468. A sealing gasket 475 is disposed at the lower end of the sleeve 465. A cone-shaped valve member 469 cooperates with the valve seat 466 to control fuel flow into the fuel chamber 451. The valve portion 469 has an upwardly extending arm 470 projecting through an opening in the guide member 468, an expansive coil spring 471 being disposed between the valve 469 and the abutment or member 468 whereby the spring normally biases the valve toward closed position.

The valve 469 is fashioned with a depending stem 472 adapted to be engaged by a lever 473 in the fuel chamber 451, the lever being fulcrumed at one end upon a pin 474 mounted in the chamber 451. The distal end region of the lever is arranged to be engaged by the button 460 of the rivet 459. A boss 476 on the housing 450 is provided with a threaded outlet bore 477 adapted to accommodate a fitting such as fitting 61 shown in FIGURE 1 which is connected by the tubular arrangement, shown in FIGURE 1, with the burner nozzle 40. The outlet bore 477 is in communication with the fuel chamber 451 by a passage 478.

In the operation of the construction shown in FIGURE 22 with the pressure equalized on the opposite sides of the diaphragm 453, the inlet valve 469 is held closed by the biasing force of the spring 471. Aspiration or reduced pressure established at the fuel nozzle 40, shown in FIGURE 1, is communicated to the chamber 451, atmospheric pressure at the opposite side of the diaphragm moves the diaphragm to swing the lever 473 in a clockwise direction opening the valve 469 whereby fuel flows into the chamber 451 thence to the fuel delivery nozzle 40.

Failure or cessation of aspiration or reduced pressure in the chamber 451, or fracture or impairment of the diaphragm 453 effects equalization of pressures at opposite sides of the diaphragm and the valve 469 closed by the spring 471 to interrupt further fuel flow to the burner nozzle.

FIGURE 23 illustrates a form of control unit wherein the diaphragm acts directly on the inlet valve. The housing or body member 480 is provided with an annular portion 481 defining a fuel chamber 482, a planar surface of the annular portion forming a seat for a gasket 483. A flexible diaphragm 484, forming a flexible wall of the chamber 482, has its peripheral region in engagement with the gasket 483. A closure plate 485 secures the gasket and diaphragm in assembled relation with the housing 480, the closure plate being secured in position by screws 486.

The plate 485 is shaped or recessed to provide an air chamber 488 to accommodate flexing movements of the diaphragm, the air chamber being vented to the atmosphere through a vent opening 489. The diaphragm is flanked at each side by reinforcing discs 498 secured to the diaphragm by a rivet 491 having a head portion 492. The housing 480 has a threaded inlet bore 494 in communication with a smooth bore 495, the latter accommodating a valve 496 slidable in the bore. The bore terminates in an inwardly extending flange 497 forming a valve seat for a cone-shaped portion 498 formed on the valve 496.

The flange 497 defines a port 499, the latter accommodating a depending stem 500 formed integrally with the valve 496. An articulated connection is provided between the diaphragm 484 and the valve member 496. As shown in FIGURE 24, a portion 502 is struck up from the upper metal reinforcing disc 498 and is formed to the configuration shown in FIGURE 23 with a horizontal portion 504, the end of which is bifurcated to be received in a recess 505 provided in the depending stem 500, the furcations straddling the reduced portion of the stem provided by the recess 505.

This construction provides a direct positive connection between the diaphragm construction and the valve 496 whereby movements of the diaphragm control the position of the inlet valve.

The housing 480 is provided with a threaded outlet bore 506 in communication with chamber 482 by connecting passages 507 and 508, the outlet bore 506 accommodating a fitting such as fitting 61 in FIGURE 1, the tubular construction shown in FIGURE 1 connected with the fitting conveying fuel to the burner nozzle 40.

In the operation of the construction shown in FIGURES 23 and 24, aspiration or reduced pressure at the region of the burner nozzle is communicated through the outlet bore 506 and passages 507 and 508 with the fuel chamber 482 to establish reduced pressure therein whereby the diaphragm 484 is actuated by atmospheric pressure at the opposite side of the diaphragm to elevate and thereby open the fuel inlet valve 498 to establish fuel flow from the fuel supply tank to the burner nozzle.

In this form the fuel pressure of the supply exerts force downwardly on the inlet valve 496 to normally engage the valve portion 498 with the seat 497 to interrupt fuel flow. The unit should be positioned with the axis of the inlet valve 496 in a substantially vertical position. As in the other forms of control mechanism hereinbefore described, failure or interruption of aspiration or fracture of the diaphragm effects equalization of pressures at opposite sides of the diaphragm whereby the valve 498 is closed to prevent further flow of fuel to the burner nozzle.

FIGURE 25 illustrates a control unit of the invention embodying another form of fuel inlet valve. The unit is inclusive of a housing 510 fashioned with an annular portion 511 defining a fuel chamber 512, a planar face of the annular portion forming a seat for an annular gasket 513.

A flexible impervious diaphragm 514 extends across the chamber 512 and forms a flexible wall of the chamber. The periphery of the diaphragm engages the gasket 513 and a closure plate 515, secured to the housing by screws 516, holds the diaphragm and gasket in assembled relation with the housing 510.

The central region of the closure plate 515 is depressed or shaped to provide an air space or chamber 517 accommodating flexing movements of the diaphragm, the space 517 being vented to the atmosphere through a vent opening 518. The housing 510 is fashioned with a threaded inlet bore 520 adapted to accommodate a fitting such as fitting 106 in FIGURE 1 for connecting the unit with a fuel supply tank. The housing 510 has a threaded portion to accommodate the threaded sleeve or valve cage 522.

The sleeve 522 is fashioned with a shoulder or ledge 524 providing a seat for a spherical or ball valve 525 disposed in a valve chamber 526 in the sleeve 522. The portion of the sleeve forming the ledge 524 defines a port 527. The sleeve is provided with a head portion 528 engageable with a gasket 529. A perforated member or grid 530 is pressed into or fixedly mounted in a counterbore in the sleeve 522, the perforated member preventing dislodgement of the valve from the cage. The diaphragm 514 is flanked at each side by reinforcing discs 532 secured in assembled relation with the diaphragm by a rivet 533.

In this form the rivet head 534 is provided with an upwardly extending stem 535 which is adapted, when the diaphragm 514 is flexed upwardly, to engage and dislodge the ball valve 525 from its seat to permit flow of fuel from the supply into the fuel chamber 512. The housing 510 is fashioned with a threaded outlet bore 536 in communication with chamber 512 by passageways 537 and 538. The outlet bore 536 is adapted to accommodate a fitting such as fitting 61, shown in FIGURE 1, which is connected by a tubular and passage arrangement, shown in FIGURE 1, with the fuel delivery nozzle 40 of the burner.

In the operation of the control unit shown in FIGURE 25, aspiration or reduced pressure communicated from the region adjacent the nozzle 40 to the fuel chamber 512 establishes reduced pressure in chamber 512 whereby atmospheric pressure at the opposite side of the diaphragm flexes the diaphragm and moves the ball valve 525 from its seat to facilitate fuel flow through the control unit to the burner nozzle. The gravity head or fuel pressure of the supply at the inlet is effective against the ball valve 525 to bias the valve toward closed position when the diaphragm is in its normal or unflexed position thereby interrupting fuel flow to the burner nozzle.

In this construction the ball valve is acted upon directly by the stem 535 carried by the diaphragm. The unit should be used in a position in which the axis of the stem 535 is substantially vertical and the stem disposed beneath the ball valve to assure proper engagement of the ball valve with its seat 524.

Fracture of the diaphragm or interruption of aspiration equalizes the pressures at opposite sides of the diaphragm enabling the ball valve to engage its seat under hydrostatic pressure and interrupt fuel flow.

The construction shown in FIGURE 26 is similar to the arrangement shown in FIGURE 25 but includes mechanical means for biasing the ball valve toward closed position. The housing 510a is fashioned with a fuel chamber 512a, a flexible diaphragm 514a forming a wall of the chamber, the diaphragm being secured in place by a closure plate 515a. The space 517a between the plate 515a and the diaphragm accommodates movements of the diaphragm and is vented to the atmosphere through the vent 518a.

The housing 510a is provided with a threaded inlet bore 520a and a valve cage or sleeve 522a is received in a second threaded portion in the housing. A ball valve 525a is disposed in an interior chamber in the sleeve 522a and is normally biased toward closed position by an expansive coil spring 540 arranged between an abutment 541 carried by the sleeve 522a. The ball valve seats against a circular shoulder 524a formed on the sleeve 522a.

The diaphragm is flanked at each side by reinforcing discs 532a held in assembly by a rivet 533a, the rivet being fashioned with a stem 535a adapted to move the ball valve 525a away from its seat upon flexure or movement of the diaphragm 514a toward the valve.

The housing is fashioned with a threaded outlet bore 536a in communication with the fuel chamber 512a by interconnecting passageways 537a and 538a, the bore 536a accommodating a fitting such as fitting 61 shown in FIGURE 1 which, through a tubular arrangement and passages, is connected with a burner fuel delivery nozzle 40.

The operation of the arrangement shown in FIGURE 26 is substantially the same as the operation of the arrangement shown in FIGURE 25 with the exception that the ball valve 525a is biased toward closed position by the additional force of the expansive spring 540. Through the use of a spring associated with the ball inlet valve 525a, the control unit shown in FIGURE 26 may be used in any relative position.

FIGURE 27 is a sectional view illustrating a modified form of fuel flow control unit of the invention. A housing or body member 545 is formed with a generally annular portion 546 defining a fuel chamber 547, a planar surface of the portion 546 forming a seat for a gasket 548. An impervious flexible diaphragm 549 forms a flexible wall of the chamber 547, the peripheral region of the diaphragm engaging the gasket 548 being engaged by a closure plate 550 held in place by screws 551 threaded into openings in the housing 545.

The central region of the closure plate 550 is depressed or shaped to provide an air space or chamber 552 which is vented to the atmosphere by an opening 553 in the plate 550.

The diaphragm 549 is flanked at each side by reinforcing discs 554 secured to the diaphragm by a rivet 555 having a head or button portion 556. A lever 558 in the chamber 547 is fulcrumed intermediate its end upon a fulcrum pin 559 mounted in the chamber.

The housing 545 is fashioned with a threaded inlet bore 561 to accommodate an inlet fitting such as fitting 106 shown in FIGURE 1. The housing is provided with a port 563 and a circular valve seat 564, the latter being at the upper end of a smooth bore 565 in the housing. Slidably disposed in the bore 565 is an elongated valve 566 having a cone-shaped valve portion 567 arranged to engage the seat 564 for closing the inlet port 563. The lower end of the valve member 566 is adapted to engage the lever arm at the right side of the fulcrum 559.

The valve 566 is biased toward closed position by spring means. Fashioned in the housing 545 is a bore 569 accommodating a contractile coil spring 570. A transverse threaded bore receives a threaded member 571, the latter being fashioned with a tenon 572 extending into the bore 569. The upper end of the spring 570 is hooked over or attached to the tenon 572. A hook portion 573 at the lower end of the spring 570 engages the right-hand end of the lever. The contractile spring 570 normally biases the valve 566 toward closed position. A threaded outlet bore 575 in the housing 545 is in communication with the fuel chamber 547 by interconnecting passageways 576 and 577.

The arrangement shown in FIGURE 27 operates in the following manner: Aspiration or reduced pressure established at the burner nozzle is communicated through the outlet bore 575 and passages 576 and 577 to the fuel chamber 547. Reduced pressure in chamber 547 causes atmospheric pressure in the space 552 to flex the diaphragm upwardly effecting clockwise movement of the lever 558 about its fulcrum and against the contractile force of the spring 570 to move the valve from its seat 564 to permit fuel flow into the fuel chamber thence to the burner nozzle 40.

Failure of aspiration or reduced pressure in the chamber 547 or fracture of the diaphragm, whereby pressures at opposite sides of the diaphragm are equalized, effects a closing of the valve 566 under the influence of the contractile spring 570 to interrupt fuel flow through the control unit. As the valve 566 is normally biased toward closed position by the spring 570, the control unit is insensitive to position and may be disposed in any relative position.

FIGURE 28 is a sectional view illustrating another form of control unit of the invention. In this form the housing 580 is formed with a substantially annular portion 581, the planar face thereof providing a seat for a gasket 582, the annular portion 581 defining a fuel chamber 583.

A flexible impervious diaphragm 584, forming a flexible wall of the chamber 583, has its peripheral region engaging the gasket 582, the diaphragm and gasket being held in assembled relation with the housing 580 by a closure plate 585 held in place by screws 586.

The central region of the closure plate 585 is depressed or shaped to provide an air chamber 587, the chamber 587 being vented to the atmosphere by a vent opening 588. The diaphragm 584 is flanked at each side with reinforcing discs 589 secured to the diaphragm by a rivet 590 having a head or button 591. Disposed in the fuel chamber 583 is a lever 593 fulcrumed intermediate its ends upon a fulcrum pin 594 supported in the fuel chamber 583.

The housing 580 is fashioned with a threaded inlet bore 596 in communication with a smooth bore 597 in the housing 580 by a port 598. A valve or valve member 600 is slidably mounted in the bore 597, the valve having a cone-shaped valve portion 601 adapted to seat against a ledge or shoulder 602 defining the entrance of the port 598. The lower end of the valve member 600 is adapted to be engaged by the short arm of the lever 593, the long arm of the lever being adapted to be engaged by the button 591 carried by the diaphragm 584.

A torsion spring means is arranged to normally bias the valve member 600 toward closed position. As shown in FIGURES 28 and 29, a coil spring or torsion spring 604 is coiled around the fulcrum pin 594, one end region 605 of the spring engaging the lever in a region at the left-hand of the fulcrum, as shown in FIGURE 28.

The upper wall defining the fuel chamber 583 is fashioned with a recess 606 to receive the opposite end region 607 of the torsion spring 604.

The spring 604 is coiled or tensioned whereby downward pressure is exerted by the portion 605 of the spring against the lever 593 tending to swing the lever in a counterclockwise direction about its fulcrum. This action of the spring is transmitted through the lever to the valve member 600 and serves to bias the valve toward closed position. The housing 580 has a threaded outlet bore 609 to accommodate a fitting such as fitting 61 for connection with the burner nozzle, shown in FIGURE 1. The bore 609 is in communication with the fuel chamber 583 through connecting passageways 610 and 611.

In the operation of the control mechanism shown in FIGURES 28 and 29, aspiration set up at the fuel delivery nozzle 40, shown in FIGURE 1, is transmitted through the bore 609 and the passageways 610 and 611 to the fuel chamber 583. Reduced pressure in the fuel chamber 583 causes the diaphragm 584 to be actuated by air pressure in the space 587, rotating the lever in a clockwise direction against the torsion force of the spring 604 whereby the valve 600 is opened to admit fuel flow through the port 598 and bore 597 into the chamber 583 thence to the burner nozzle 40.

Interruption of aspiration or fracture of the diaphragm 584 effects pressure equalization at opposite sides of the diaphragm causing the inlet valve 600 to be closed by the spring 604.

Figure 30:
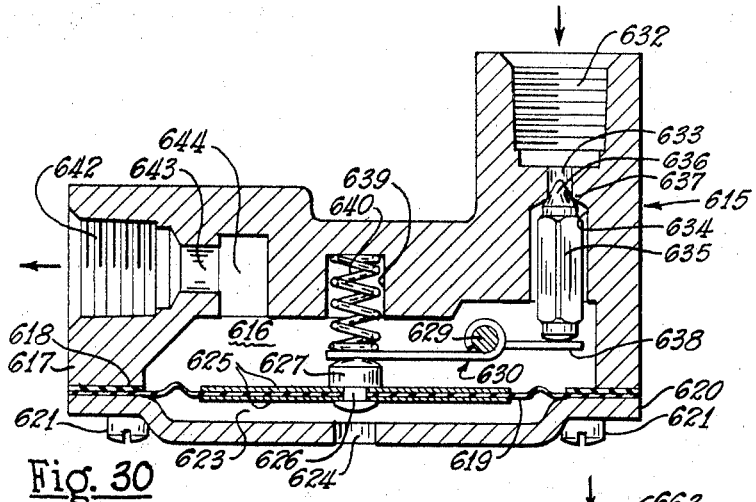
FIGURE 30 is a sectional view illustrating another modification of fuel flow control mechanism.

FIGURE 30 illustrates a modified form of fuel flow control unit of the invention. The housing or body member 615 is fashioned with a fuel chamber 616 defined by a generally annularly-shaped portion 617, the planar face thereof providing a seat for an annular gasket 618. A flexible impervious diaphragm 619 forms a flexible wall of the chamber 616, the peripheral region of the diaphragm engaging the gasket 618, a closure plate 620 retaining the gasket and diaphragm in assembled relation with the body by screws 621.

The central region of the closure plate 620 is depressed or shaped to provide an air chamber 623 to accommodate flexing movements of the diaphragm 619, the space 623 being vented to the atmosphere through a vent opening 624. The diaphragm 619 is flanked at each side by reinforcing discs 625 secured to the diaphragm by a rivet 626 having a head portion 627. Fulcrumed upon a pin 629 mounted in the chamber 616 is a lever 630.

The housing 615 is fashioned with a threaded inlet bore 632 connected by a port 633 with a smooth bore 634 in which is slidably mounted an inlet valve 635. The valve 635 has a cone-shaped valve portion 636 arranged to seat against a circular ledge or shoulder 637 which defines the port 633. The lower end of the valve 635 is arranged to be engaged by the short arm 638 of the lever 630.

The housing 615 has a recess 639 which accommodates an expansive coil spring 640 which is bottomed in the recess and which engages the end region of the left-hand arm of the lever 630. The spring 640 normally biases the valve portion 636 of the valve member 635 toward closed position. The housing is fashioned with a threaded outlet bore 642 adapted to accommodate a fitting 61 of the character shown in FIGURE 1 which is connected by a tubular passage arrangement with the burner nozzle 40. The bore 642 is in communication with the fuel chamber 616 through connecting passages 643 and 644.

In the operation of the arrangement shown in FIGURE 30, aspiration set up adjacent the burner nozzle 40 is communicated through the bore 642 and passages 643 and 644 to the fuel chamber 616. Reduced pressure set up in chamber 616 causes atmospheric pressure at the opposite side of the diaphragm 619 to actuate the diaphragm against the pressure of the spring 640, swinging the lever 630 in a clockwise direction to permit opening of the valve member 635 and thereby facilitate fuel flow from the supply through the inlet bore 632 past the valve 635 and through the fuel chamber 616 to the fuel delivery nozzle.

As the valve 635 is biased toward closed position by the spring 640, the control unit is insensitive to position and may be satisfactorily operated in any position.

Failure or interruption of aspiration or fracture of the diaphragm will effect equalization of pressures at opposite sides of the diaphragm and the expansive pressure of spring 640 biases the inlet valve 635 to closed position to interrupt fuel flow.

Figure 31:
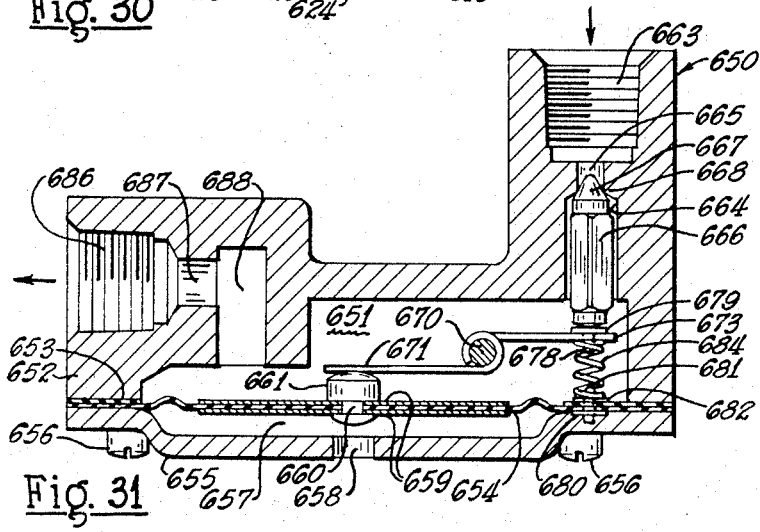
FIGURE 31 is a sectional view illustrating a further modification of fuel flow control mechanism.

FIGURE 31 illustrates a further form of the control unit of the invention. The housing 650 is fashioned with a fuel chamber 651 defined by a substantially annular portion 652, the planar face thereof forming a seat for an annular gasket 653. An impervious flexible diaphragm 654 forms a flexible wall of the chamber 651 and has its peripheral region engaging the gasket 653. A closure plate 655 secures the diaphragm and gasket in assembled relation with the housing 650 by screws 656.

The central region of the plate or closure member 655 is depressed or shaped to form an air chamber 657 to accommodate flexing movements of the diaphragm, the space or chamber 657 being vented to the atmosphere through an opening 658. The diaphragm 654 is flanked at opposite sides by reinforcing discs 659 secured to the diaphragm by a rivet 660, the latter having a head or button portion 661. The housing 650 is provided with a threaded inlet bore 663 in communication with a smooth bore 664 through an inlet port 665.

Mounted in the bore 664 for slidable movement is a valve member 666 having a cone-shaped valve portion 667 arranged to cooperate with a valve seat 668 defining the entrance of the port 665.

A fulcrum pin 670 is mounted in the chamber 651 and a lever 671 is fulcrumed upon the pin 670. The left-hand arm of the lever 671 is adapted to be engaged by the button or rivet head 661, and the right-hand arm 673 of the lever extends to a region adjacent the lower end of the valve member 666. The arm 673 of the lever is provided with an opening adapted to receive a tenon 678 of a button 679, the button adapted for engagement with the lower end of the valve member 666.

The closure plate 655 is provided with a bore in which is pressed a button 680 having an upwardly projecting portion 681. Disposed between a washer 682 on the projection 681 and the end of the lever arm 673 is an expansive coil spring 684 arranged to normally bias the valve member 666 toward closed position. The housing 650 has a threaded outlet bore 686 connected by passages 668 and 688 with the fuel chamber 651. The outlet bore 686 is adapted to accommodate a fitting such as fitting 61 shown in FIGURE 1 for connecting the outlet bore with a burner nozzle 40 in the manner shown in FIGURE 1.

The arrangement shown in FIGURE 31 functions in a manner similar to the arangement shown in FIGURE 30. Aspiration developed at the burner nozzle by the high velocity air stream is communicated to the fuel chamber 651, and amtospheric pressure at the opposite side of the diaphragm actuates the diaphragm against the compressive stress of the spring 684 permitting the fuel inlet valve 666 to move away from its seat opening the port 665 whereby fuel from a supply flows through the inlet passagesways 665 and 664 into the fuel chamber 651 thence through the outlet passages to the burner nozzle.

Figure 32:
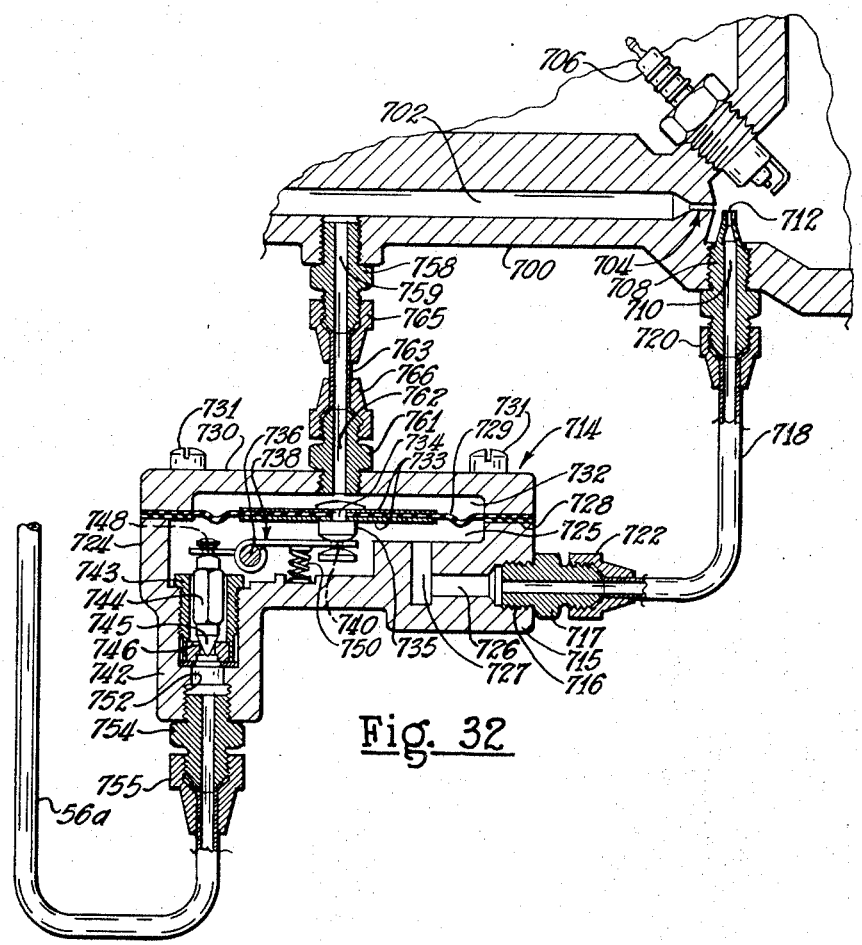
FIGURE 32 is a semi-schematic sectional view illustrating an arrangement wherein super atmospheric pressure is utilized for actuating a fuel flow control mechanism.

FIGURE 32 illustrates a fuel control unit in association with a combustion burner construction wherein the diaphragm of the control unit is subjected to superatmospheric pressure and the fuel delivery nozzle subjected to aspiration or reduced pressure to effect fuel flow through the control unit to the fuel delivery nozzle. A fragmentary portion of a combustion burner is illustrated which includes a member 700 provided with an air passage 702 which receives air under pressure from an air pump such as the vane type pump shown in FIGURE 1 or other air stream producing means.

The air passage 702 is provided with a restricted nozzle 704, an ignitor or spark plug 706 being supported by the member 700 for igniting the fuel and air mixture formed adjacent the air delivery nozzle 704. A member 708 is threaded into a threaded bore in the member 700 and is fashioned with a central channel or passage 710 which terminates in a fuel delivery nozzle 712. The fuel flow control unit or construction 714 includes a body member or housing 715 provided with a threaded outlet bore 716 accommodating a fitting 717.

A fuel conveying tube 718 is joined to the nozzle fitting 708 by a coupling 720 and with the fitting 717 by a coupling member 722. The body or housing 715 of the control unit is provided with a substantially annular portion 724 defining a fuel chamber 725, the planar face of the portion 724 forming a seat for an annular gasket 728.

An impervious flexible diaphragm 729 forms a flexible wall of the fuel chamber 725, the peripheral region of the diaphragm engaging the gasket 728. A closure plate 730 secures the diaphragm and gasket in assembled relation with the body or housing 715 by screws 731.

The closure 730 is recessed or shaped to provide an unvented air chamber or space 732, which accommodates flexing movements of the diaphragm 729. The fuel chamber 725 is in communication with the outlet bore 716 by connecting passageways 726 and 727. The diaphragm is flanked at each side with reinforcing discs 733 and a rivet 734 extends through aligned openings in the diaphragm and reinforcing discs for securing these components in assembled relation, the rivet having a head or button portion 735.

Mounted in the fuel chamber 725 is a fulcrum pin 736 on which is fulcrumed a lever 738, the lever being fulcrumed intermediate its ends. The long arm of the lever is bifurcated at its end region, the furcations straddling a tenon 740 formed by a recess in the button 735 of the rivet 734, providing a shackle connection or positive connection between the lever 738 and the diaphragm 729. The housing 715 is provided with a boss portion 742 having a threaded bore accommodating a valve cage or sleeve 743 in which is slidably mounted an inlet valve 744 having a cone-shaped valve portion 745 cooperating with an annular valve seat 746.

The upper end region of valve 744 is fashioned with a recess providing a tenon 748. The short arm of the lever 738 is bifurcated, the furcations extending into the recess and straddling the tenon 748 on the valve for establishing a shackle connection or positive connection between the lever and the valve. The annular valve seat 746 is preferably made of metal or heat resistant material to reduce the liability of failure of the valve seat and thereby reduce the liability of the unit being rendered ineffective by fire.

An expansive coil spring 750 is disposed between a wall of the fuel chamber 725 and the long arm of the lever 738 normally biasing the inlet valve 744 to closed position to interrupt fuel flow into the fuel chamber 725. The boss 742 is fashioned with a threaded inlet bore 752 accommodating a fitting 754 which is joined with a fuel supply tube 56a by a coupling member 755, the tube 56a being connected with a fuel tank or fuel supply such as the tank 54 shown in FIGURE 1.

In this form of the invention, superatmospheric pressure is impressed in the unvented air chamber 732 from air under pressure in the passage 702 of the burner construction. Extending into a threaded bore in the wall of the air passage 700 is a fitting 758 having a central passage 759. Threaded into a bore in the closure plate 730 is a fitting 761 having a central passage 762.

A connecting tube 763 is joined with the fitting 758 by a coupling member 765 and with the fitting 761 by a coupling member 766, providing a continuous air channel from the air passage 702 in the burner with the unvented air chamber 732 in the closure plate 730.

In the operation of this form of the invention, the air pressure producing means or pump is brought into operation and electric energy supplied to the ignition or spark plug 706 to provide a spark for igniting a fuel mixture. Air pressure developed in the passage 702 is communicated through the ducts 759, 762 and the tube 763 to impress superatmospheric pressure in the air chamber 732. Simultaneously with establishment of air pressure at the dry side of the diaphragm 729, the high velocity air stream through the air restriction 704 sets up aspiration or reduced pressure on the fuel nozzle 712 which impresses subatmospheric pressure in the fuel chamber 725 through the tube 718, fitting 717 and connecting passageways 726 and 727.

The establishment of superatmospheric pressure in the chamber 732 and the reduced pressure in the fuel chamber 725 causes flexure of the diaphragm 729, effecting clockwise movement of the lever 738 about its fulcrum 736, compressing the spring 750 and, through the shackle connection of the lever with the inlet valve 744, moves the inlet valve to open the inlet port in the valve seat 746.

When the valve 744 is opened, fuel from the fuel tank flows through the tube 56a, the tubular fitting 754 past the valve 744 through the fuel chamber 725, the fuel being discharged from the nozzle 712 to form a combustible mixture with the high velocity air stream moving through the air delivery nozzle 704. If desired, additional air may be supplied to the fuel and air mixture thus formed by auxiliary air supply means such as the impeller 76, shown in FIGURE 1.

Thus fuel flow control is exercised through the differential pressures existent at opposite sides of the diaphragm 729. Upon failure of air pressure in the passage 702 and hence in the air chamber 732, or in the event of fracture of the diaphragm 729, the pressures at opposite sides of the diaphragm become equalized, and the biasing pressure of the spring 750 immediately closes the fuel inlet valve 744 to interrupt fuel flow to the burner.

Figure 33:
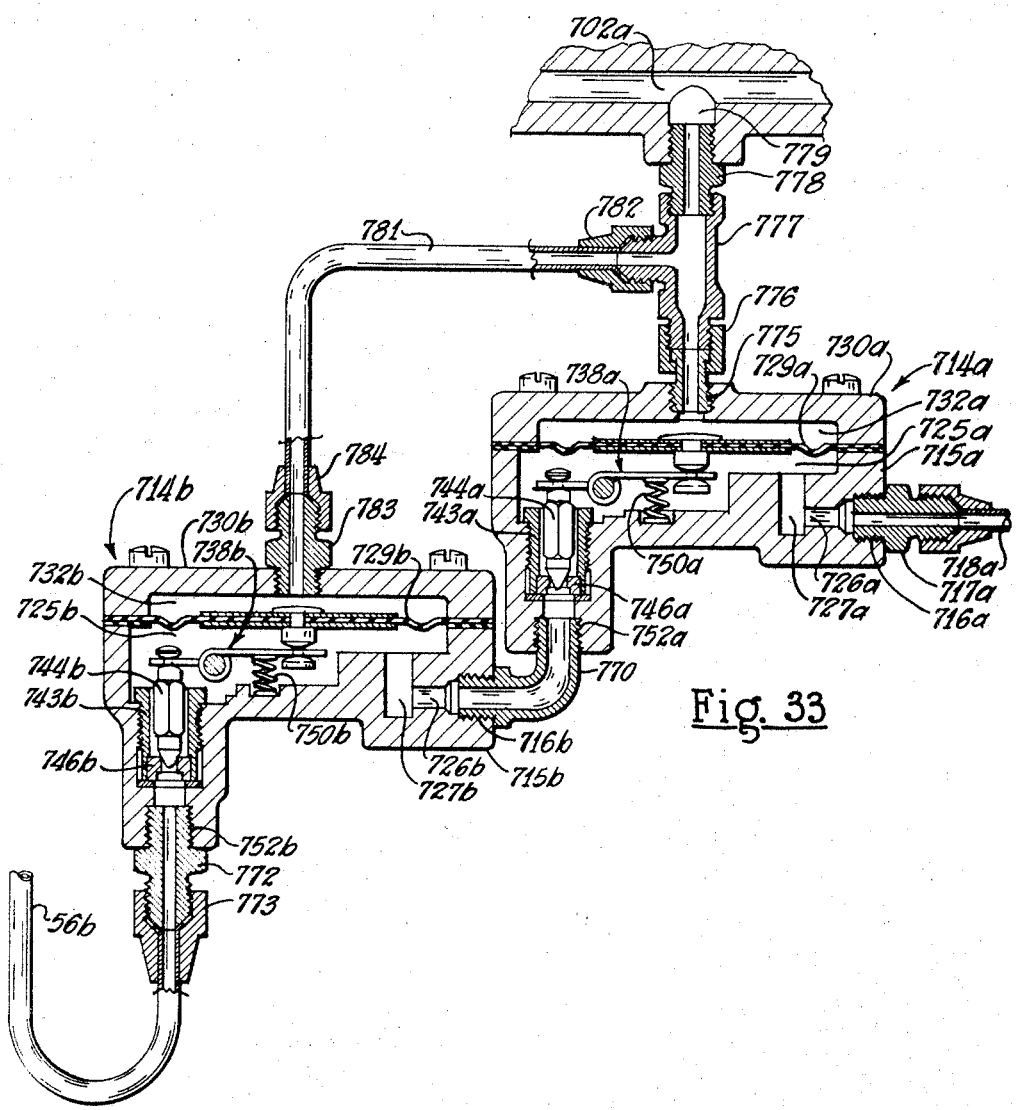
FIGURE 33 is a semi-schematic sectional view illustrating an arrangement of dual control units of the character shown in FIGURE 32.

FIGURE 33 illustrates the use of two units of the character shown in FIGURE 32 arranged in successive or tandem relation whereby two pressure actuated inlet valves control fuel flow to the burner for added safety. In the arrangement shown in FIGURE 33, the pressure actuated inlet control valve unit 714a is substantially identical with the control unit 714 shown in FIGURE 32. The second control unit 714b, shown in FIGURE 33, is substantially identical with the control unit 714a.

The control unit 714a includes a housing 715a provided with an outlet bore 716a accommodating an outlet fitting 717a which, with a tube 718a, is arranged to convey fuel to a burner nozzle such as nozzle 712, shown in FIGURE 32. The housing 715a is shaped to provide a fuel chamber 725a, one wall of which is provided by a flexible diaphragm 729a secured in place by a cover or closure 730a, the closure being recessed to provide an unvented air chamber 732a. Fuel chamber 725a is in communication with the outlet bore 716a by connecting passages 726a and 727a.

A lever 738a in the fuel chamber 725a provides means for transferring flexible movements of the diaphragm 729a to a valve 744a contained in a valve cage or sleeve 743a, the valve cooperating with an annular valve seat 746a to control fuel flow into the fuel chamber 725a. An expansive coil spring 750a normally biases the inlet valve toward closed position.

The control unit 714b includes a housing 715b provided with an outlet bore 716b. The housing 715b is shaped to provide a fuel chamber 725b, one wall of which is provided by a flexible diaphragm 729b secured in place by a cover or closure 730b, the closure being recessed to provide an unvented air chamber 732b. Fuel chamber 725b is in communication with the outlet bore 716b by connecting passages 726b and 727b.

A lever 738b provides means for transferring flexible movements of the diaphragm 729b to a valve 744b contained in a valve cage or sleeve 743b, the valve 744b cooperating with an annular valve seat 746b to control fuel flow into the fuel chamber 725b. An expansive coil spring 750b normally biases the inlet valve toward closed position.

The inlet bore 752a in the unit 714a is connected by means of a tubular fitting 770 with the outlet bore 716b of the control unit 714b whereby the fuel flow from the fuel chamber 725b flows through the fitting 770 past the valve 744a into the fuel chamber 725a thence to the fuel delivery nozzle of the burner. The inlet bore 752b receives a tubular fitting 772 connected by means of a coupling 773 with a tube 56b arranged to be connected with a fuel tank or fuel supply such as the tank 54 shown in FIGURE 1.

The chambers 732a and 732b of the control units are arranged to be supplied with superatmospheric pressure from the air passage 702a of the burner construction. The cover 730a has a threaded bore accommodating a fitting 775 forming a component of a union 776 for connecting the tubular fitting 775 with a T-shaped fitting 777. The opposite opening of the T-shaped fitting is connected by means of a tubular fitting 778 with a passage 779 opening into the air passage 702a.

The side branch of the T-shaped fitting 777 is connected with a tube 781 by a coupling 782, the tube 781 being connected to a tubular fitting 783 by a coupling 784. The tubular fitting 783 is threaded into an opening in the cover 730b. The air chamber 732b is in communication with the air passage 702a through the fitting 783, tube 781, T-shaped fitting 777 and the tubular fitting 778. Thus superatmospheric pressure developed by air under pressure in the passage 702a is concomitantly transmitted to the air or dry chambers 732a and 732b.

Pressure in these chambers causes downward flexure of the diaphragms to thereby open both inlet valves 744a and 744b whereby fuel flows from the supply successively through both control units and to the fuel delivery nozzle 712, shown in FIGURE 32, where the delivered fuel is mixed with the air stream from the passage 702a. In the event that foreign matter lodges under one of the inlet valves, the other inlet valve is effective to interrupt fuel flow when the burner is not in operation. Failure of air pressure in the passage 702a or fracture of either diaphragm will cause both valves to be closed due to pressure equalization in the fuel and air chambers. It is preferable that the valve seat 746b be made of metal to provide resistance to damage by fire. The valve seat 746a may be made of metal or yieldable nonmetallic material such as synthetic rubber.

It will therefore be seen from FIGURES 32 and 33, that a single air pressure actuated diaphragm unit may be used by itself or, as shown in FIGURE 33, substantially identical control units may be used in sequential or tandem relation. Where maximum safety is desired, it is preferable to use two units in the relation illustrated in FIGURE 33.

It is apparent that, within the scope of the invention, modifications and different arrangements may be made other than as herein disclosed, and the present disclosure is illustrative merely, the invention comprehending all variations thereof.

We claim:

1. The method of delivering liquid fuel to a combustion burner having a fuel delivery nozzle including establishing a supply of liquid fuel, directing air under pressure to a region adjacent the nozzle, and transmitting pressure adjacent the nozzle to a pressure responsive diaphragm arranged to control a fuel inlet valve for a fuel chamber to control fuel flow from the chamber to the fuel delivery nozzle of the burner.

2. The method of delivering liquid fuel to a combustion burner having a fuel and air mixing zone including establishing a supply of liquid fuel, establishing air flow of a velocity to the mixing zone to set up aspiration on a fuel delivery nozzle, transmitting pressure developed by the air flow to an unvented chamber having a flexible wall, and transmitting relative movement of the flexible wall caused by the developed pressure to a fuel valve for controlling fuel flow from the supply to the fuel delivery nozzle.

3. The method of delivering liquid fuel to a combustion burner having a fuel delivery nozzle including establishing a supply of liquid fuel, establishing air pressure at the nozzle to set up aspiration on a fuel delivery nozzle, transmitting pressure to a pressure responsive body at an unvented confined region, and controlling the position of a fuel valve by the pressure responsive body under the influence of the transmitted pressure to control fuel flow from the supply to the fuel delivery nozzle.

4. The method of delivering liquid fuel from a fuel supply to a fuel and air mixing zone of a combustion burner, delivering air at substantial velocity to the mixing zone, transmitting pressure caused by the air flow to an unvented chamber for actuating a pressure responsive component, actuating a valve controlling a fuel port by relative movement of the pressure responsive component to establish fuel flow from the supply to the mixing zone, and interrupting fuel flow by closing the valve by the pressure responsive component when pressures affecting the pressure responsive component are substantially equalized.

5. A fuel flow control unit for a combustion burner adapted to burn liquid fuel comprising, in combination, a housing provided with a cavity, an impervious diaphragm extending across the cavity forming a fuel chamber, a fuel inlet passage in the housing for conveying fuel to the fuel chamber, a fuel control inlet valve in said passage, said valve being normally biased toward closed position, means carried by said diaphragm directly engaging said inlet valve arranged to control the relative position of said valve responsive to differential pressures at opposite sides of the diaphragm, and a fuel outlet passage for the fuel chamber arranged to be connected with means for conveying fuel from the chamber to the combusion burner.

6. A fuel flow control apparatus for a combustion burner adapted to burn a liquid fuel and air mixture wherein fuel is delivered from a supply to a fuel nozzle by aspiration comprising, in combination, a housing provided with a cavity, an impervious diaphragm extending across the cavity forming a fuel chamber, a fuel inlet passage in said housing in communication with the fuel chamber, an inlet valve in said passage, a fuel filter through which fuel flows before entering the fuel chamber, resilient means normally biasing the inlet valve toward closed position, means carried by said diaphragm in direct engagement with said valve whereby differential pressures at opposite sides of the diaphragm effect movement thereof to a position to permit opening movement of the inlet valve, and a fuel outlet passage for the fuel chamber arranged to be connected with means for conveying fuel from the fuel chamber to the combustion burner.

7. Fuel flow control apparatus for a combustion burner comprising, in combination, housing means having two recesses, a flexible diaphragm extending across each of said recesses, said recesses providing a first fuel chamber and a second fuel chamber, first fuel duct in communication with the first fuel chamber, an inlet valve in the duct, a second duct between the first and second fuel chambers, an inlet valve in the second duct, means carried by each diaphragm directly engaging respectively each inlet valve whereby flexure of the diaphragms influences the said valves for controlling fuel flow through said first and second chambers in sequence, said valves being normally biased toward closed position, and an outlet for the second fuel chamber adapted to be connected with means for conveying fuel to the burner.

References Cited

UNITED STATES PATENTS

| 1,613,969 | 1/1927 | Swartz et al. | 137—205 |
| 2,635,392 | 4/1953 | Gratzmuller | 137—505.12 X |
| 2,744,387 | 5/1956 | Reed et al. | 137—505.12 X |
| 3,177,920 | 4/1965 | Phillips | 123—179 |

FREDERICK L. MATTESON, JR., *Primary Examiner.*

R. A. DUA, *Assistant Examiner.*

U.S. Cl. X.R.

123—119; 137—505.13; 239—8; 431—89